United States Patent [19]
Ozawa

[11] Patent Number: 5,054,897
[45] Date of Patent: Oct. 8, 1991

[54] PLASTIC ZOOM LENS

[75] Inventor: Toshiro Ozawa, Kawasaki, Japan

[73] Assignee: Ricoh Company, Ltd., Tokyo, Japan

[21] Appl. No.: 560,835

[22] Filed: Jul. 31, 1990

[30] Foreign Application Priority Data

Aug. 3, 1989 [JP] Japan .................... 1-201764
Dec. 22, 1989 [JP] Japan .................... 1-333654

[51] Int. Cl.⁵ .............................................. G02B 15/00
[52] U.S. Cl. .................................. 350/426; 359/691;
359/676; 359/652; 359/708
[58] Field of Search ............... 350/426, 427, 432, 423, 350/413

[56] References Cited

U.S. PATENT DOCUMENTS 4,516,839 5/1985 Tokumaru ........................ 350/426
4,653,873 3/1987 Kawamura ....................... 350/426
4,699,474 10/1987 Ozawa ............................. 350/427
4,999,007 3/1991 Aoki et al. ....................... 350/426

Primary Examiner—Bruce Y. Arnold
Assistant Examiner—Hung Xuan Dang
Attorney, Agent, or Firm—Oblon, Spivak, McClelland, Maier & Neustadt

[57] ABSTRACT

A plastic zoom lens has a first group of lenses having negative refracting power and arranged on an object side of the zoom lens; a second group of lenses having positive refracting power and arranged on an image side of the zoom lens; and a device for changing a focal length of the plastic zoom lens by changing a distance between the first and second groups of lenses. The first group of lenses have a first lens group composed of a negative plastic lens having a large curvature face on the image side thereof and at least one aspherical surface and a positive plastic lens having a large curvature face on the object side thereof. The negative and positive plastic lenses are sequentially arranged from the object side of the zoom lens. The first group of lenses further have at least one negative lens arranged on the object side of the first lens group. The second group of lenses have a second lens group composed of a positive plastic lens having a large curvature face on the object side thereof and a negative plastic lens having a large curvature face on the image side thereof. The positive and negative plastic lenses are sequentially arranged from the object side of the zoom lens. The second group of lenses further have at least one positive lens arranged on each of the object and image sides of the second lens group.

8 Claims, 19 Drawing Sheets

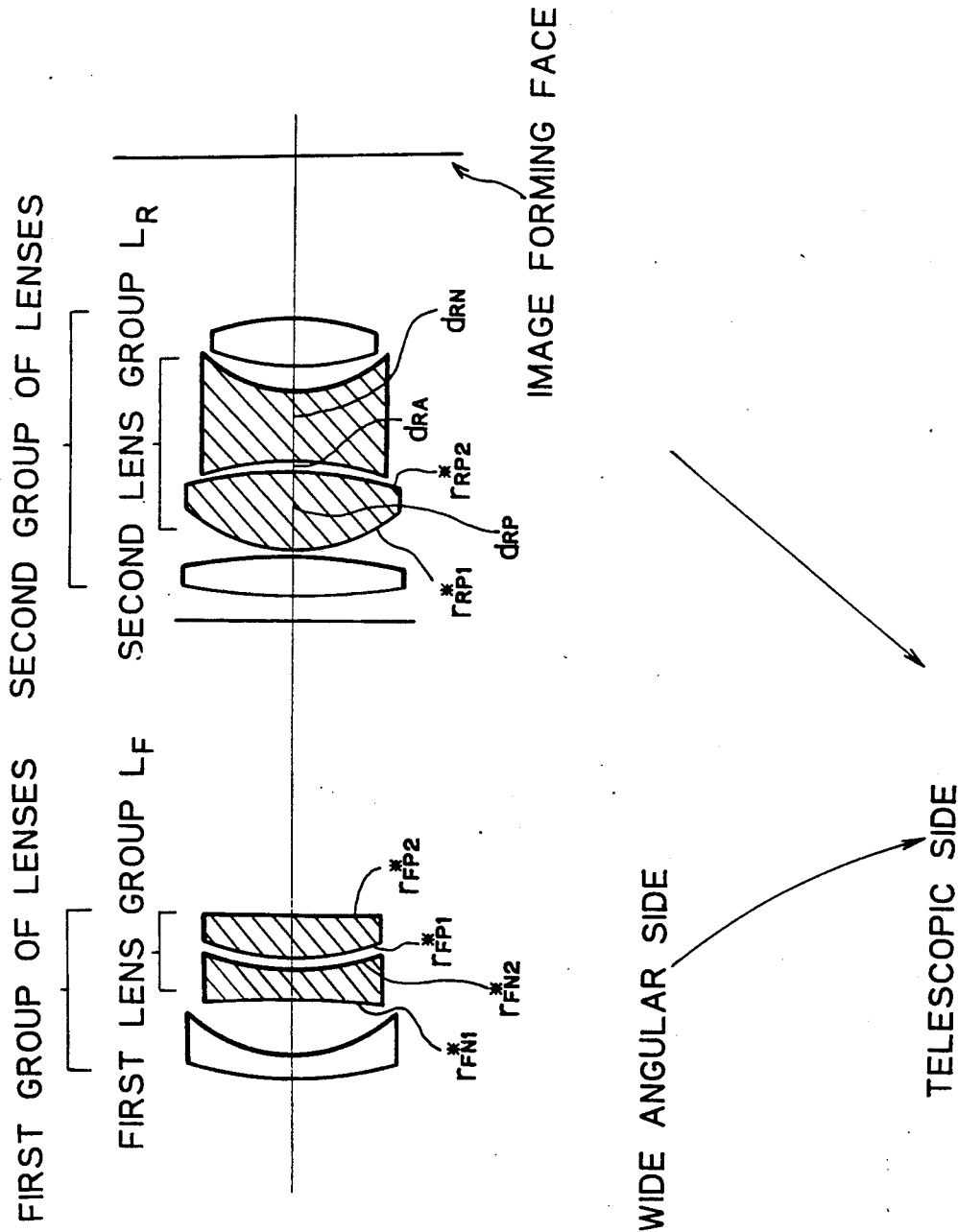

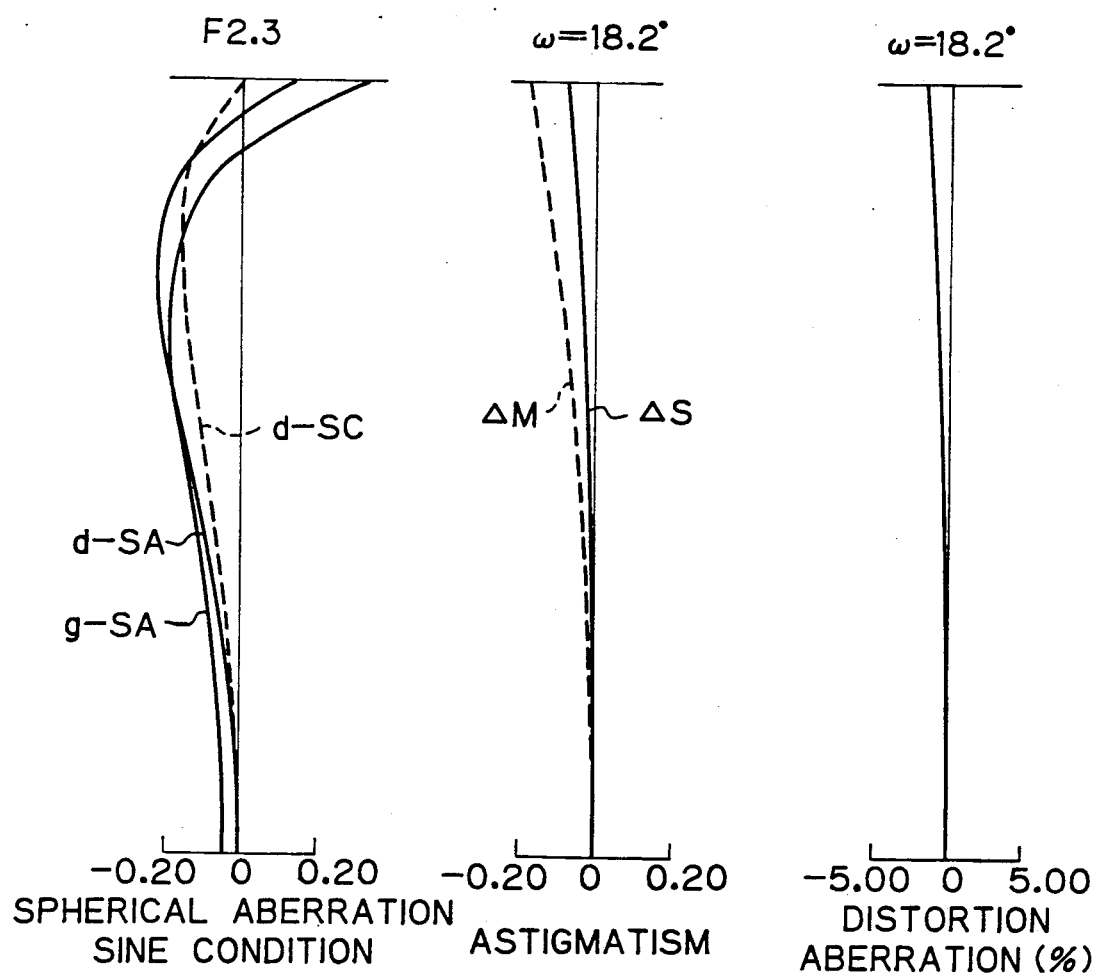

PLASTIC ZOOM LENS

BACKGROUND OF THE INVENTION

1. Field of the Invention

The present invention relates to a plastic zoom lens especially suitable for a video camera, an electronic still camera, etc.

2. Description of the Related Art

Two groups of negative and positive zoom lenses are composed of a first group of lenses having negative refracting power arranged on an object side and a second group of lenses having positive refracting power arranged on an image side. Focal lengths of the two groups of negative and positive zoom lenses are changed by changing a distance between the first and second groups of lenses. The two groups of negative and positive zoom lenses provide a relatively small zoom ratio, but the number of constructional lenses is small and a zoom mechanism is simplified. Accordingly, such zoom lenses are widely known and used as lenses for a camera, a video camera, etc.

Recently, a plastic lens has been practically used as a light lens cheaply manufactured. In the above two groups of zoom lenses, the zoom lenses are partially constructed by the plastic lens as shown by e.g., Japanese Patent Application Laying Open (KOKAI) Nos. 57-20713, 57-67908, 58-5707, etc.

However, in the known two groups of zoom lenses, a single plastic lens is used so that no advantages of lightness in weight and cheapness in manufacture of the plastic lens are sufficiently used. Further, as is well known, changes in volume and refractive index of the plastic lens caused by a change in temperature are greater than those of a glass lens so that image forming performance tends to be reduced by the change in temperature. Accordingly, it is necessary to correct the reduction of the image forming performance. However, when only one plastic lens is used, it is very difficult to perform such correction.

SUMMARY OF THE INVENTION

It is therefore an object of the present invention to provide a novel plastic zoom lens in which the plastic zoom lens is light in weight and cheaply manufactured and the reduction of image forming performance caused by the change in temperature is corrected.

The above object of the present invention can be achieved by a plastic zoom lens comprising a first group of lenses having negative refracting power and arranged on an object side of the zoom lens; a second group of lenses having positive refracting power and arranged on an image side of the zoom lens; and means for changing a focal length of the plastic zoom lens by changing a distance between the first and second groups of lenses. The second group of lenses have a second lens group composed of a positive plastic lens having a large curvature face on the object side thereof and a negative plastic lens having a large curvature face on the image side thereof. The positive and negative plastic lenses are sequentially arranged from the object side of the zoom lens. The second group of lenses further have at least one positive lens arranged on each of the object and image sides of the second lens group. A focal length $f_I$ of the first group of lenses, a focal length $f_{II}$ of the second group of lenses, a combined focal length $F_W$ of an entire lens system at a wide angular terminal thereof, and Abbe numbers $\nu_{RP}$ and $\nu_{RN}$ of the positive and negative lenses in the second lens group satisfy the following conditions.

$$1.7 < |f_I|/F_W < 2.5 \quad \text{(a)}$$

$$0.7 < f_{II}/|f_I| < 1.0 \quad \text{(b)}$$

$$\nu_{RP} > 50 \quad \text{(c)}$$

$$\nu_{RN} < 37 \quad \text{(d)}$$

The above object of the present invention can be also achieved by a plastic zoom lens comprising a first group of lenses having negative refracting power and arranged on an object side of the zoom lens; a second group of lenses having positive refracting power and arranged on an image side of the zoom lens; and means for changing a focal length of the plastic zoom lens by changing a distance between the first and second groups of lenses. The first group of lenses have a first lens group composed of a negative plastic lens having a large curvature face on the image side thereof and at least one aspherical surface and a positive plastic lens having a large curvature face on the object side thereof. The negative and positive plastic lenses are sequentially arranged from the object side of the zoom lens. The first group of lenses further have at least one negative lens arranged on the object side of the first lens group. A focal length $f_I$ of the first group of lenses, a focal length $f_{II}$ of the second group of lenses, a combined focal length $F_W$ of an entire lens system at a wide angular terminal thereof, and Abbe numbers $\nu_{FN}$ and $\nu_{FP}$ of the negative and positive lenses in the first lens group satisfy the following conditions.

$$1.7 < |f_I|/F_W < 2.5 \quad \text{(a)}$$

$$0.7 < f_{II}/|f_I| < 1.0 \quad \text{(b)}$$

$$\nu_{FN} > 50 \quad \text{(e)}$$

$$\nu_{FP} < 37 \quad \text{(f)}$$

The above object of the present invention can be also achieved by a plastic zoom lens comprising a first group of lenses having negative refracting power and arranged on an object side of the zoom lens; a second group of lenses having positive refracting power and arranged on an image side of the zoom lens; and means for changing a focal length of the plastic zoom lens by changing a distance between the first and second groups of lenses. The first group of lenses have a first lens group composed of a negative plastic lens having a large curvature face on the image side thereof and at least one aspherical surface and a positive plastic lens having a large curvature face on the object side thereof. The negative and positive plastic lenses are sequentially arranged from the object side of the zoom lens. The first group of lenses further have at least one negative lens arranged on the object side of the first lens group. The second group of lenses have a second lens group composed of a positive plastic lens having a large curvature face on the object side thereof and a negative plastic lens having a large curvature face on the image side thereof. The positive and negative plastic lenses are sequentially arranged from the object side of the zoom lens. The second group of lenses further have at least one positive lens arranged on each of the object and image sides of the second lens group. A focal length $f_I$ of the first group of lenses, a focal length $f_{II}$ of the second group of lenses, a combined focal length $F_W$ of an entire lens system at a wide angular terminal thereof, Abbe numbers $\nu_{FN}$ and $\nu_{FP}$ of the negative and positive lenses in the first lens group, and Abbe numbers $\nu_{RP}$ and $\nu_{RN}$ of the positive and negative lenses in the second lens group satisfy the following conditions.

$$1.7 < |f_I|/F_W < 2.5 \quad (a)$$

$$0.7 < f_{II}/|f_I| < 1.0 \quad (b)$$

$$\nu_{RP} > 50 \quad (c)$$

$$\nu_{RN} < 37 \quad (d)$$

$$\nu_{FN} > 50 \quad (e)$$

$$\nu_{FP} < 37 \quad (f)$$

In accordance with the above-mentioned structure, the plastic zoom lens is light in weight and manufactured at reduced cost and the reduction of image forming performance caused by the change in temperature is corrected.

Further objects and advantages of the present invention will be apparent from the following description of the preferred embodiments of the present invention as illustrated in the accompanying drawings.

BRIEF DESCRIPTION OF THE DRAWINGS

FIG. 1 is a view for explaining a plastic zoom lens in the present invention.

DESCRIPTION OF THE PREFERRED EMBODIMENTS

Figure 2A:
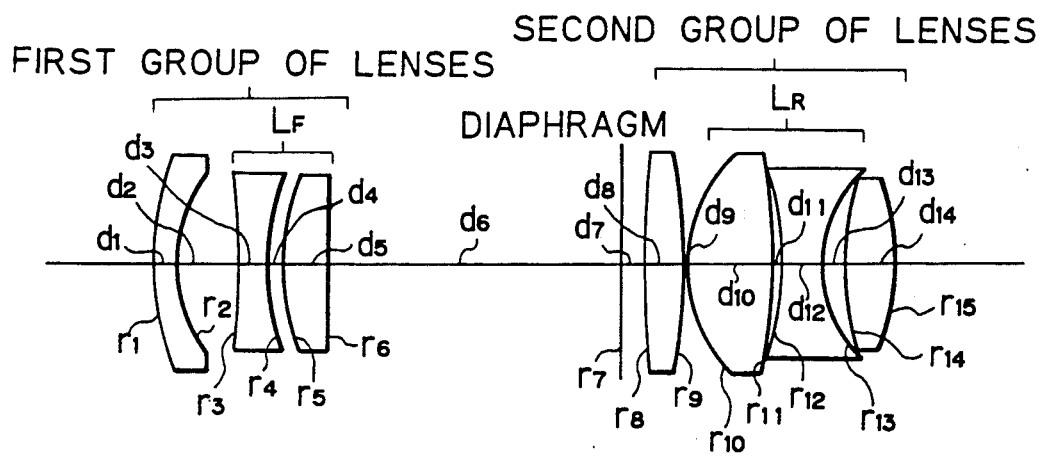
FIGS. 2(a) to 7(d) are views showing the constructions of plastic zoom lenses and aberration diagrams thereof in first to sixth concrete embodiments of the present invention.

The preferred embodiments of a plastic zoom lens in the present invention will next be described in detail with reference to the accompanying drawings.

In a plastic zoom lens in the present invention, as concretely shown in FIG. 1, a first group of lenses having negative refracting power are arranged on an object side of the zoom lens (leftward in FIG. 1). A second group of lenses having positive refracting power are arranged on an image side of the zoom lens (rightward in FIG. 1). The first and second groups of lenses are displaced as shown by arrows in FIG. 1 to change a distance therebetween, thereby changing a focal length of the plastic zoom lens.

In plastic zoom lenses in first to third embodiments of the present invention, a focal length $f_I$ of the first group of lenses, a focal length $f_{II}$ of the second group of lenses, and a combined focal length $F_W$ of an entire lens system at a wide angular terminal thereof satisfy the following conditions.

$$1.7 < |f_I|/F_W < 2.5 \quad (a)$$

$$0.7 < f_{II}/|f_I| < 1.0 \quad (b)$$

In the plastic zoom lens in the first embodiment of the present invention, the second group of lenses have a second lens group $L_R$ composed of a positive plastic lens having a large curvature face on the object side thereof and a negative plastic lens having a large curvature face on the image side thereof. The positive and negative plastic lenses are sequentially arranged from the object side of the zoom lens. The second group of lenses further have at least one positive lens on each of the object and image sides of the second lens group $L_R$.

Abbe numbers $\nu_{RP}$ and $\nu_{RN}$ of the positive and negative lenses in the second lens group $L_R$ satisfy the following conditions.

$$\nu_{RP} > 50 \quad (c)$$

$$\nu_{RN} < 37 \quad (d)$$

In the plastic zoom lens in the second embodiment of the present invention, the first group of lenses have a first lens group $L_F$ composed of a negative plastic lens having a large curvature face on the image side thereof and at least one aspherical surface and a positive plastic lens having a large curvature face on the object side thereof. The negative and positive plastic lenses are sequentially arranged from the object side of the zoom lens. The first group of lenses further have at least one negative lens arranged on the object side of the first lens group $L_F$.

Abbe numbers $\nu_{FN}$ and $\nu_{FP}$ of the negative and positive lenses in the first lens group $L_F$ satisfy the following conditions.

$$\nu_{FN} > 50 \quad (e)$$

$$\nu_{FP} < 37 \quad (f)$$

In the plastic zoom lens in the third embodiment of the present invention, the first group of lenses have a first lens group $L_F$ composed of a negative plastic lens having a large curvature face on the image side thereof and at least one aspherical surface and a positive plastic lens having a large curvature face on the object side thereof. The negative and positive plastic lenses are sequentially arranged from the object side of the zoom lens. The first group of lenses further have at least one negative lens arranged on the object side of the first lens group $L_F$. The second group of lenses have a second lens group $L_R$ composed of a positive plastic lens having a large curvature face on the object side thereof and a negative plastic lens having a large curvature face on the image side thereof. The positive and negative plastic lenses are sequentially arranged from the object side of the zoom lens. The second group of lenses further have at least one positive lens on each of the object and image sides of the second lens group $L_R$.

Abbe numbers $\nu_{FN}$ and $\nu_{FP}$ of the negative and positive lenses in the first lens group $L_F$, and Abbe numbers $\nu_{RP}$ and $\nu_{RN}$ of the positive and negative lenses in the second lens group $L_R$ satisfy the following conditions.

$$\nu_{RP} > 50 \quad (c)$$

$$\nu_{RN} < 37 \quad (d)$$

$$\nu_{FN} > 50 \quad (e)$$

$$\nu_{FP} < 37 \quad (f)$$

When a plastic material for the plastic lens has a refractive index n (d-line) and an Abbe number $\nu$ (d-line), the refractive index n and the Abbe number $\nu$ approximately satisfy the following inequality.

$$(n - 1.48) \times (\nu - 9) < 3$$

Accordingly, the refractive index of the plastic material is lower than that of a normal glass material.

Therefore, to preferably obtain aberration performance by using many plastic lenses in the two groups of negative and positive zoom lenses, it is necessary to set refracting power to each of the lens groups to be smaller than that in the case of the two groups of zoom lenses constructed by only glass lenses.

In the above conditions (a) to (f), the conditions (a) and (b) are basic conditions for constructing the two groups of the negative and positive zoom lenses by using a plurality of plastic lenses in the first group of lenses and/or the second group of lenses. Accordingly, such conditions (a) and (b) must be satisfied with respect to the plastic zoom lens in the present invention.

When the refracting power of the first group of lenses is increased and the ratio in the condition (a) exceeds a lower limit thereof, an aberration amount caused in the first group of lenses is increased so that it is difficult to correct this aberration by another condition. In contrast to this, when the refracting power of the first group of lenses is decreased and the ratio in the condition (a) exceeds an upper limit thereof, the distance between the first and second groups of lenses is increased at a wide angular time. Therefore, an effective diameter of a light beam with respect to the second group of lenses is increased and high-order aberration is greatly caused so that it is difficult to perform the aberration correction of the entire lens system.

The condition (b) is a condition for balancing and correcting the aberrations of the first and second groups of lenses. When a plurality of plastic lenses are used in the first group of lenses and/or the second group of lenses and the ratio in the condition (b) is a value outside the range set in the condition (b), the aberration of the entire lens system is corrected excessively or insufficiently. Therefore, it is very difficult to provide preferable aberration performance.

The change in refractive index of the plastic material caused by a change in temperature is about 100 times that of the glass material. A coefficient of linear expansion of the plastic material is about 10 times that of the glass material. Therefore, when the plastic lens is used as a zoom lens and environmental temperature is changed, the position of a face for forming an image thereon is changed so that image quality is reduced. In the case of the zoom lens using the plastic lens, it is necessary to simultaneously consider the problems about the aberration correction and the change in position of the image forming face caused by the change in temperature.

In general, the refractive index of the plastic lens having positive refracting power is reduced and a radius of curvature thereof is increased as temperature is increased. Therefore, the position of the image forming face is displaced in the direction of the positive refracting power. In other words, back focus is increased as temperature is increased.

In contrast to this, the refractive index of the plastic lens having negative refracting power is decreased and a radius of curvature thereof is increased as temperature is increased. Therefore, the position of the image forming face is displaced in the direction of the negative refracting power. In other words, back focus is decreased as temperature is increased.

Accordingly, to correct the change in position of the image forming face caused by the change in temperature, it is sufficient to use the positive and negative plastic lenses by combining them with each other as a pair so as to cancel the changes in position of the image forming face caused by the change in temperature with respect to the positive and negative lenses.

As mentioned above, the plastic lens is used in the second group of lenses to preferably perform the balancing aberration correction and correct the change in position of the image forming face caused by the change in temperature. To preferably perform the balancing aberration correction and correct the change in position of the image forming face, the second group of lenses have a second lens group $L_R$ composed of a positive plastic lens arranged on the object side thereof and a negative plastic lens arranged on the image side thereof. Further, it is necessary to provide more than one positive lens on each of the object and image sides of this second lens group.

With respect to the two groups of negative and positive zoom lenses, the second group of lenses fulfill a function for converting a divergent light beam from the first group of lenses to a convergent light beam. At least one positive lens is arranged on the object side of the second lens group constructed by two plastic lenses. Accordingly, the divergent light beam formed by the first group of lenses is converted to a parallel light beam or a gradually converged light beam and can be guided to the second lens group $L_R$. When this positive lens is not arranged, the positive lens within the second lens group $L_R$ bears an excessive burden of conversion of the light beam. Further, since the positive lens is composed of a plastic lens and has a low refractive index, spherical aberration is increased so that it is difficult to correct the spherical aberration in an entire zoom region.

When more than one positive lens is not arranged on the image side of the second lens group $L_R$, aberrations such as spherical aberration, comatic aberration, astigmatism, etc. are greatly caused so that it is substantially impossible to correct such aberrations.

Further, when the arrangement order of the positive and negative lenses is changed to that of the negative and positive lenses within the second lens group $L_R$, the spherical aberration with respect to an intermediate aperture is greatly caused so that it is substantially impossible to correct this spherical aberration. Accordingly, the arrangement order of the plastic lenses within the second lens group $L_R$ is preferably that of positive and negative lenses.

When more than one positive lens is arranged on each of the object and image sides of the second lens group $L_R$, it is possible to suitably reduce a combined refracting power of the second lens group $L_R$. Thus, the refracting powers of the positive and negative lenses within the second lens group $L_R$ are balanced. Therefore, moving amounts of image forming faces provided by the positive and negative lenses and caused by the change in temperature are approximately equal to each other and can be canceled.

The above-mentioned contents will next be described in detail. In the case of a zoom lens having a zoom ratio and an F-number in concrete embodiments described later, the combined focal length $f_R$ of the second lens group $L_R$ and a combined focal length $f_{II}$ of the second group of lenses desirably satisfy the following condition.

$$-0.37 < f_{II}/f_R < 0.05 \qquad (g)$$

When the above condition (g) is not satisfied, the change in position of the image forming face caused by the change in temperature is excessively increased in the direction of the positive or negative refracting power so that the zoom lens cannot be practically used.

Further, the positive lens within the second lens group $L_R$ preferably has a large curvature face on the object side and the negative lens preferably has a large curvature face on the image side to reduce aberration caused within the second lens group $L_R$. When the positive lens has the large curvature face on the image side, great spherical and comatic aberrations are caused by an action of the positive lens. When the negative lens has the large curvature face on the object side, astigmatism and comatic aberration are greatly caused so that it is difficult to correct the astigmatism and the comatic aberration.

To realize preferable image forming performance by the zoom lens having the zoom ratio and the F-number in the concrete embodiments described later, it is desirable to satisfy the following conditions (h) and (i).

$$-5.0 < (r_{RP1}^* - r_{RP2}^*)/(r_{RP1}^* + r_{RP2}^*) < -1.0 \quad (h)$$

$$0.03 < d_{RA}/(d_{RP} + d_{RA} + d_{RN}) < 0.15 \quad (i)$$

The condition (h) is a condition for prescribing the shape of the positive lens within the second lens group $L_R$. As shown in FIG. 1, $r_{RP1}^*$ and $r_{RP2}^*$ in this condition respectively represent paraxial radii of curvature of positive lens faces of the second lens group $L_R$ on the object and image sides thereof. An aspherical surface is represented by the following formula, $$Z = [(h^2/R)/\{1 + \sqrt{1 - (1 + K) \cdot h^2/R^2}\}] + Ah^2 + Bh^4 + Ch^6 + Dh^8 + Eh^{10} \quad (1)$$

where Z is a depth of the lens in the direction of an optical axis, R a radius of curvature of the lens on the optical axis, h a height of the lens from the optical axis, K a conical constant, and A, B, C, D, E are aspherical coefficients of higher orders. In this case, a paraxial radius $r^*$ of curvature is defined as follows by the radius R of curvature of the lens on the optical axis and the aspherical coefficient A of the second order.

$$r^* \equiv 1/\{(1/R) + 2A\} \quad (2)$$

When the ratio in the condition (h) is a value outside the range thereof, aberration caused in the above positive lens is increased so that spherical and comatic aberrations tend to be insufficiently corrected especially at a wide angular time.

As shown in FIG. 1, $d_{RP}$, $d_{RN}$ and $d_{RA}$ in the condition (i) respectively designate a thickness of the positive lens, a thickness of the negative lens and a distance between the positive and negative lenses in the second lens group $L_R$. The condition (i) is a condition for prescribing the distance between the positive and negative lenses in the second lens group. When the lens distance $d_{RA}$ is reduced and the ratio in this condition exceeds a lower limit thereof, the positive and negative lenses cross each other so that it is impossible to preferably construct the lens group. In contrast to this, when the lens distance $d_{RA}$ is increased and the ratio in this condition (i) exceeds an upper limit thereof, astigmatism is insufficiently corrected especially at a telescopic time.

The above-mentioned conditions (c) and (d) are basic conditions for reducing chromatic aberration caused in the second group of lenses.

When these conditions (c) and (d) are not satisfied, the chromatic aberration on the optical axis of the lens is insufficiently corrected so that it is very difficult to correct the chromatic aberration in the entire lens system. It is possible to prevent chromatic aberration of magnification from being insufficiently corrected at the wide angular time by satisfying the condition (d).

The effects of the present invention can be sufficiently obtained even when two positive lenses or a junction lens composed of the positive and negative lenses is arranged on the object side of the second lens group $L_R$. Further, the effects of the present invention can be sufficiently obtained even when two positive lenses or a junction lens composed of the negative and positive lenses is arranged on the image side of the second lens group $L_R$. Thus, it is possible to realize a zoom lens having a zoom ratio greater than that in the concrete embodiments described later or an F-number smaller than that in the concrete embodiments described later.

A plastic zoom lens in a second embodiment of the present invention will next be described. In this zoom lens, a plastic lens is used in a first group of lenses.

When the plastic lens is used in the first group of lenses in combination with other lenses, the first group of lenses are constructed by a first lens group $L_F$ and at least one negative lens as follows. Namely, in the first lens group $L_F$, a negative plastic lens is arranged on the object side and a positive plastic lens is arranged on the image side. It is necessary to arrange the first lens group $L_F$ and the at least one negative lens such that the first lens group $L_F$ is located on the side closest to an image.

In accordance with the above construction of the first group of lenses, even when the change in temperature is caused, movements of positions of image forming faces provided by the positive and negative lenses in the first lens group $L_F$ are canceled. Therefore, it is possible to reduce the movements of the image forming faces as a whole. When the at least one negative lens is not disposed in the first lens group of lenses on the object side of the first lens group $L_F$, refracting powers of the positive and negative lenses are unbalanced in accordance with the aberration correction. The refracting powers of the positive and negative lenses are also unbalanced in accordance with the aberration correction even when the above negative lens is disposed, but the arrangement order of the positive and negative lenses in the first lens group $L_F$ is opposite to the above arrangement order. Therefore, the movements of the positions of the image forming faces are increased by the change in temperature in the direction of the positive or negative refracting power.

With respect to the zoom lens having the zoom ratio and the F-number in the concrete embodiments described later, a combined focal length $f_F$ of the first lens group $L_F$ and a combined focal length $f_I$ of the first lens group desirably satisfy the following condition.

$$|f_I/f_F| < 0.35 \quad (j)$$

When this condition is not satisfied, the movements of the positions of image forming faces are increased by the change in temperature so that the plastic zoom lens cannot be practically used.

Further, it is necessary to form the negative lens in the first lens group $L_F$ such that the negative lens has a large curvature face on the image side. It is also necessary to form the positive lens in the first lens group $L_F$ such that the positive lens has a large curvature face on the object side. When the shape of the negative lens is not formed as above, astigmatism and distortion aberration are greatly caused in the negative lens so that it is difficult to correct the astigmatism and the distortion aberration in the entire lens system. When the shape of the positive lens is not formed as above, various kinds of aberrations caused in the first group of lenses cannot be reduced so that it is difficult to correct these aberrations in the entire lens system. In particular, spherical aberration is greatly caused at the telescopic time.

The negative lens within the first lens group $L_F$ satisfies the condition (e). However, a plastic material satisfying this condition (e) has a low refractive index so that aberration tends to be caused in the negative lens formed by such a material. Therefore, the negative lens within the first lens group $L_F$ has the above-mentioned shape and it is necessary to set at least one lens face to an aspherical surface so as to reduce astigmatism and distortion aberration. When no aspherical surface is used, the distortion aberration cannot be sufficiently corrected especially on the wide angular side in the entire lens system. When this aspherical surface is used as a face of the negative lens on the object side thereof, the aspherical surface is formed on the image side in comparison with a spherical surface having a paraxial radius of curvature. In contrast to this, when the aspherical surface is used as a face of the negative lens on the image side thereof, the aspherical surface is formed on the object side in comparison with the spherical surface having a paraxial radius of curvature. Aberration can be reduced by such a construction. Both the negative lens faces can be constructed by aspherical surfaces. In this case, at least one aspherical surface of the negative lens desirably has the above-mentioned shape.

In the case of the zoom lens having the zoom ratio and the F-number in the concrete embodiments described later, it is desirable to satisfy the following conditions (k) and (l) or the following conditions (k) and (m) with respect to the first lens group $L_F$.

$$-2.0 < (r_{FP1}^* - r_{FP2}^*)/(r_{FP1}^* + r_{FP2}^*) < -0.3 \quad (k)$$

$$-1.0 \cdot 10^{-2} < \Delta_{FN1}/r_{FN1}^* < -1.0 \cdot 10^{-6} \quad (l)$$

$$-1.0 \cdot 10^{-1} < \Delta_{FN2}/r_{FN2}^* < -1.0 \cdot 10^{-5} \quad (m)$$

As shown in FIG. 1, $r_{FN1}^*$, $r_{FN2}^*$ and $r_{FP1}^*$, $r_{FP2}^*$ respectively designate paraxial radii of curvature of faces of the negative and positive lenses in the first lens group $L_F$. Each of $\Delta_{FN1}$ and $\Delta_{FN2}$ is an aspherical amount with respect to a lens height corresponding to 90% of an effective diameter of a face of the negative lens on each of the object and image sides thereof in the second lens group $L_F$. The above paraxial radius of curvature is defined by the above-mentioned formula (2). When $h_e$ represents the above lens height corresponding to 90% of the effective diameter of the negative lens face, the above aspherical amount is defined as follows.

$$\Delta = \{[(h_e^2/R)/\{1 + \sqrt{1 - (1 + K) \cdot h_e^2/R^2}\}] + A h_e^{2'} + B h_e^4 + C h_e^6 + D h_e^8 + E h_e^{10}\} - [(h_e^2/r^*)/\{1 + \sqrt{1 - (1 + K) \cdot h_e^2/r^{*2}}\}] \quad (3)$$

It is possible to very preferably correct spherical and comatic aberrations by satisfying the condition (k) without correcting these aberrations insufficiently and excessively. Such effects can be greatly obtained especially at the telescopic time.

It is further possible to very preferably correct astigmatism and distortion aberration by satisfying the condition (l) or (m) without correcting these aberrations insufficiently and excessively. Such effects can be greatly obtained especially at the wide angular time.

The conditions (e) and (f) are basic conditions with respect to chromatic aberration when combined plastic lenses are used in the first group of lenses. When no conditions (e) and (f) are satisfied, chromatic aberration of the first group of lenses on the optical axis thereof and chromatic aberration of magnification caused in the first group of lenses are insufficiently corrected greatly. Accordingly, it is substantially impossible to correct the chromatic aberrations in the entire lens system.

The positive and negative lenses may be arranged on the object side of the first lens group $L_F$. Otherwise, more than two negative lenses, or a junction lens composed of the positive and negative lenses may be arranged on the object side of the first lens group $L_F$. In accordance with such a structure, it is possible to realize a zoom lens having a zoom ratio greater than that in the concrete embodiments described later or an F-number smaller than that in the concrete embodiments.

A plastic zoom lens in a third embodiment of the present invention is provided by combining the features of the above-mentioned zoom lenses in the first and second embodiments of the present invention. Namely, the zoom lens in the third embodiment has a first lens group constructed by a plastic lens in a first group of lenses and a second lens group constructed by a plastic lens in a second group of lenses.

Accordingly, in the zoom lens in the third embodiment of the present invention, the description about the zoom lens in the second embodiment is effective as it is with respect to the first group of lenses, and the description about the zoom lens in the first embodiment is effective as it is with respect to the second group of lenses. Therefore, it is necessary to satisfy the conditions (a) to (f) with respect to the zoom lens in the third embodiment of the present invention. It is desirable to satisfy the conditions (g), (h), (i) and (j) with respect to the zoom lens having the zoom ratio and the F-number in the concrete embodiments described later. Further, it is desirable to satisfy the conditions (k) and (l) or the conditions (k) and (m).

Six concrete embodiments of the present invention will next be described.

In the respective concrete embodiments, $r_i$ designates a radius of curvature of an i-th lens face (including a diaphragm face) from the object side and a radius of curvature of the i-th lens face on an optical axis of the i-th lens with respect to an aspherical surface. $d_i$ designates a distance between i-lens faces. $n_j$ and $\nu_j$ respectively designate a refractive index and an Abbe number of a j-th lens from the object side. The aspherical surface is specified by the above radius of curvature of a lens face on the optical axis of the lens, a conical constant and aspherical coefficients of higher orders. An angle of view and a focal length of the entire lens system are respectively designated by $2\omega$ and F.

The refractive index of plastic constituting the plastic lens in the respective concrete embodiments is 1.49154, 1.491 and 1.4997 in the case of acrylic-based plastic and is 1.585 in the case of polycarbonate-based plastic. The following table shows the refractive indexes of these plastic materials, their rates of change in refractive index with respect to the change in temperature, and their coefficients of linear expansion.

TABLE

| refractive index | rate of change (1/°C.) | coefficient of linear expansion (1/°C.) |
|---|---|---|
| 1.49154 | $-1.2 \cdot 10^{-4}$ | $7 \cdot 10^{-5}$ |
| 1.491 | $-1.2 \cdot 10^{-4}$ | $7 \cdot 10^{-5}$ |
| 1.4997 | $-1.2 \cdot 10^{-4}$ | $7 \cdot 10^{-5}$ |
| 1.585 | $-1.4 \cdot 10^{-4}$ | $7 \cdot 10^{-5}$ |

$\Delta bf$, $\Delta bf_F$ and $\Delta bf_R$ used in the following concrete embodiments are defined as follows.

$\Delta bf$ designates a changing amount of back focus in the entire lens system when the temperature of the plastic lenses in the first and second groups of lenses is changed by $+20°$ C.

$\Delta bf_F$ designates a changing amount of back focus in the entire lens system when the temperature of the plastic lens in only the first group of lenses is changed by $+20°$ C.

$\Delta bf_R$ designates a changing amount of back focus in the entire lens system when the temperature of the plastic lens in only the second group of lenses is changed by $+20°$ C.

An influence of a glass lens caused by the change in temperature can be neglected. A flat plate is inserted onto the object side of the second group of lenses in each of concrete embodiments 4, 5, 6 and is also inserted onto the image side of the second group of lenses in each of concrete embodiments 2 and 3. This flat plate is made of glass for optical correction.

Embodiment 1

| | F = 9~18, $F_{NO}$ = 2~2.6, $2\omega$ = 51~26° | | | | |
|---|---|---|---|---|---|
| i | $r_i$ | $d_i$ | j | $n_j$ | $v_j$ |
| 1 | 17.586 | 1.2 | 1 | 1.834 | 37.3 |
| 2 | 8.356 | 3.56 | | | |
| 3 | −61.69 | 1.7 | 2 | 1.491 | 61.4 |
| 4 | 12.183 | 0.84 | | | |
| 5 | 12.706 | 2.5 | 3 | 1.585 | 29.3 |
| 6 | 97.396 | variable | | | |
| 7 | diaphragm | 1.5 | | | |
| 8 | 111.295 | 2.1 | 4 | 1.7725 | 49.6 |
| 9 | −28.67 | 0.2 | | | |
| 10 | 8.34 | 4.8 | 5 | 1.491 | 61.4 |
| 11 | −30.709 | 0.55 | | | |
| 12 | −17.654 | 2.36 | 6 | 1.585 | 29.3 |
| 13 | 7.352 | 1.31 | | | |
| 14 | 16.555 | 2.7 | 7 | 1.48749 | 70.4 |
| 15 | −14.369 | | | | |

| | Aspherical surface | |
|---|---|---|
| face number i | conical constant K | coefficient B |
| 4 | −0.49257 | $-1.1008 \cdot 10^{-5}$ |
| 6 | −28.0908 | $1.3418 \cdot 10^{-7}$ |
| 10 | 0.013904 | $-1.4912 \cdot 10^{-5}$ |
| 13 | 0.03031 | $6.0161 \cdot 10^{-5}$ |

Figure 2B:
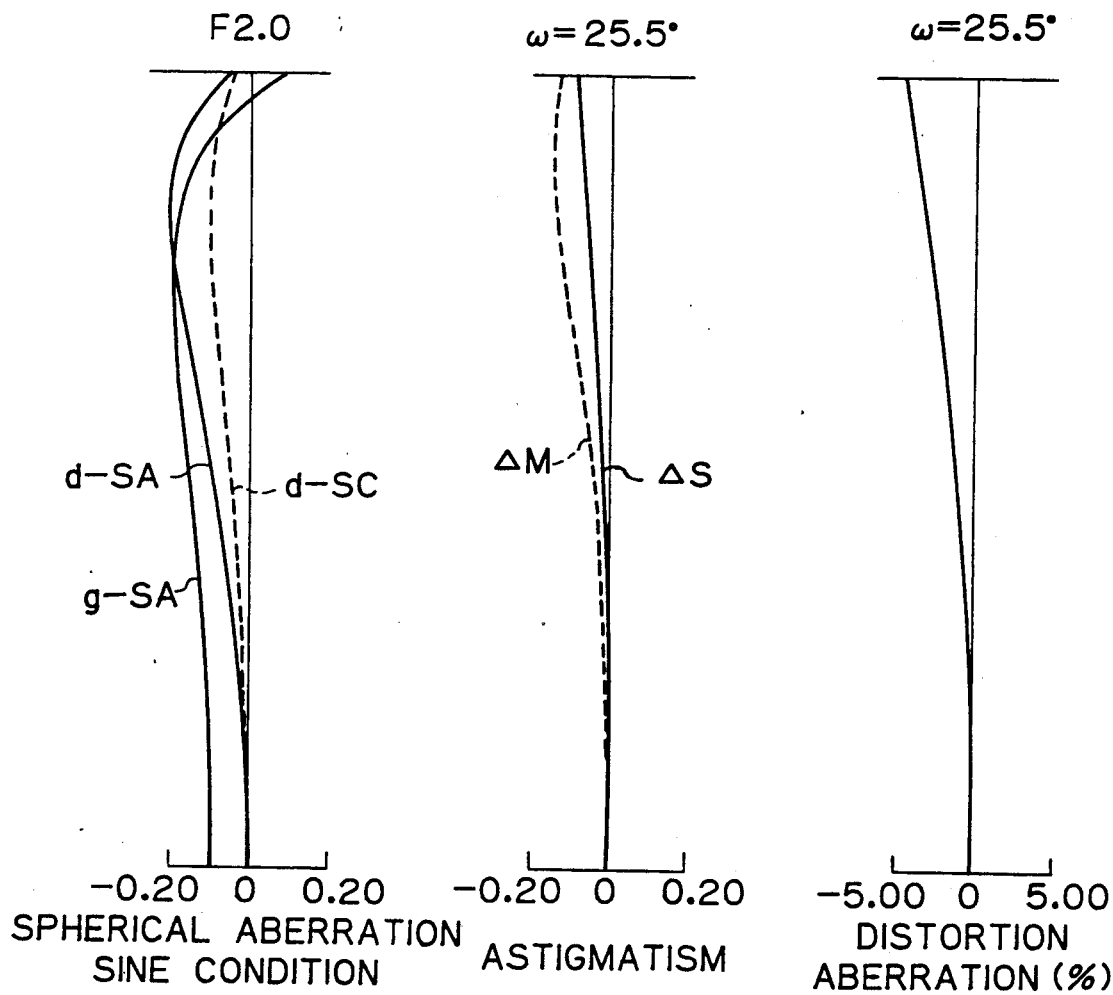
Figure 2C:
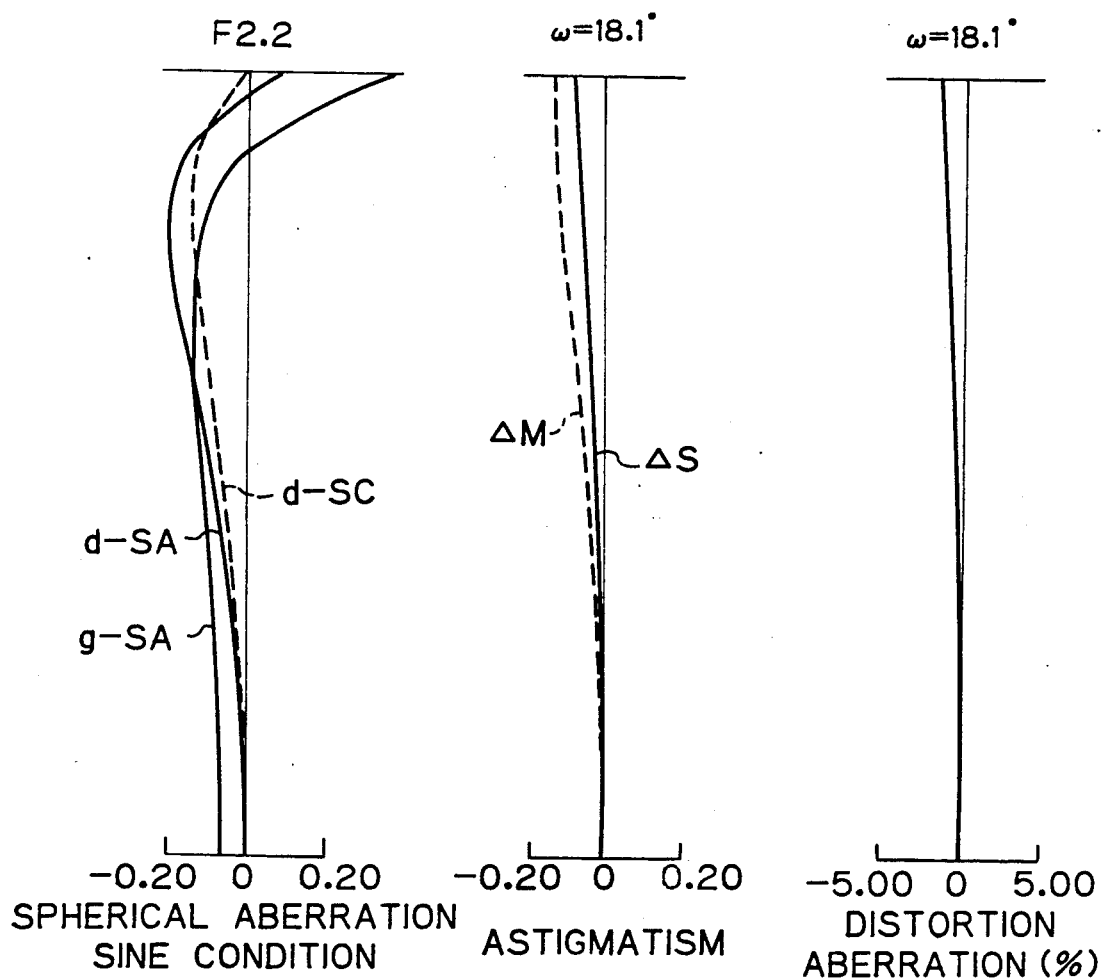
Figure 2D:
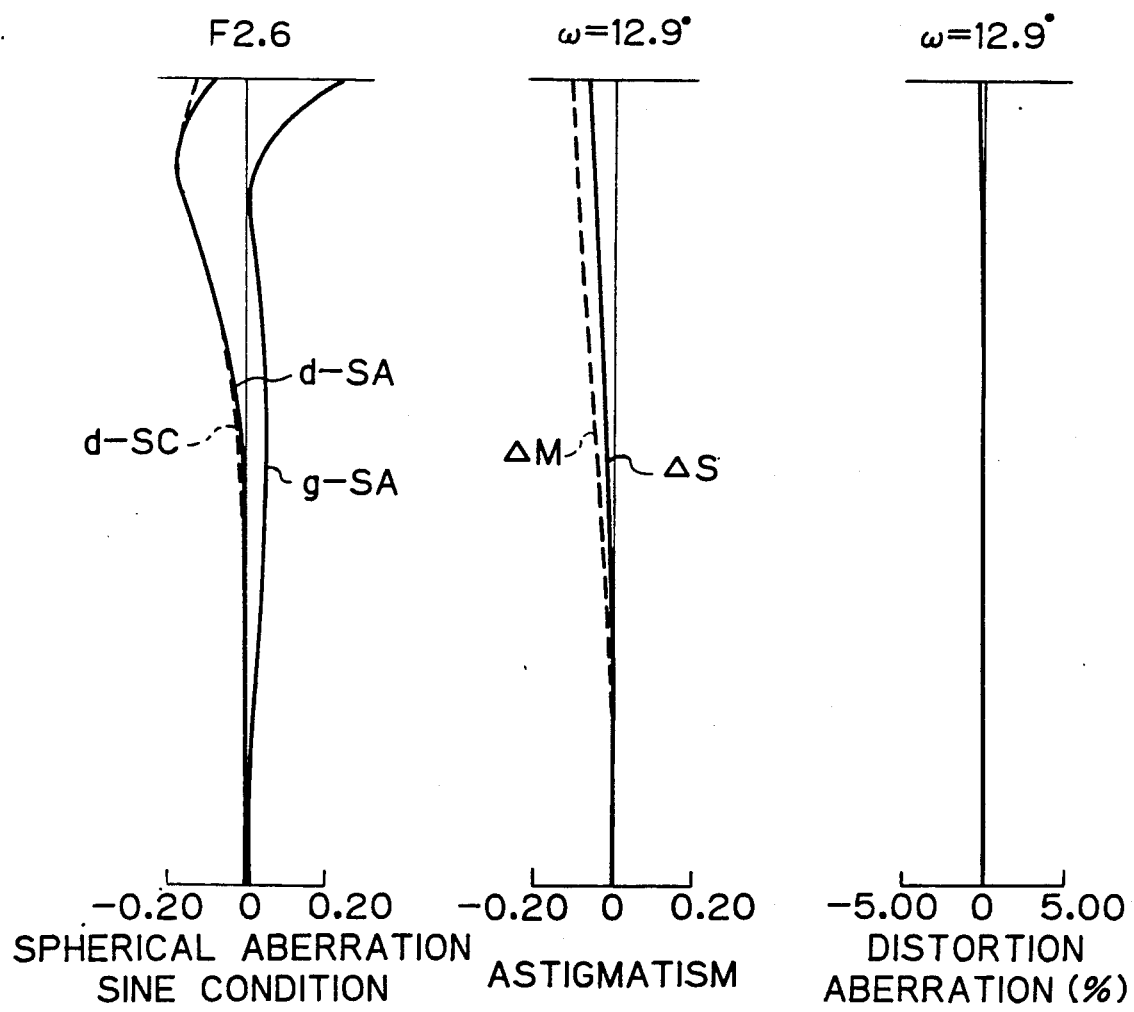

| variable amounts | | | |
|---|---|---|---|
| F | 9.0 | 12.7 | 18.0 |
| $d_6$ | 16.902 | 8.116 | 1.902 |
| $\Delta bf$ | 0.022 | 0.018 | 0.006 |
| $\Delta bf_F$ | −0.004 | −0.008 | −0.016 |
| $\Delta bf_R$ | 0.026 | 0.026 | 0.022 | parameters in conditional formulas $|f_I|/F_W = 2.0$, $f_{II}/|f_I| = 0.83$, $f_{II}/f_R = -0.14$ $|f_I/f_F| = 0.12$,
$(r_{RP1}^* - r_{RP2}^*)/(r_{RP1}^* + r_{RP2}^*) = -1.7$ $d_{RA}/(d_{RP} + d_{RA} + d_{RN}) = 0.071$, $(r_{FP1}^* - r_{FP2}^*)/(r_{FP1}^* + r_{FP2}^*) = -0.77$, $\Delta_{FN2}/r_{FN2}^* = -8.6 \cdot 10^{-4}$ FIG. 2a shows the construction of a zoom lens in the concrete embodiment 1. FIGS. 2b, 2c and 2d are respectively aberration diagrams of the zoom lens in the concrete embodiment 1 at a wide angular terminal, an intermediate portion and a telescopic terminal thereof.

Embodiment 2

| | F = 8.5~19, $F_{NO}$ = 2~2.7, $2\omega$ = 53~24° | | | | |
|---|---|---|---|---|---|
| i | $r_i$ | $d_i$ | j | $n_j$ | $v_j$ |
| 1 | 17.406 | 1.1 | 1 | 1.834 | 37.3 |
| 2 | 8.306 | 2.89 | | | |
| 3 | −37.102 | 1.5 | 2 | 1.49154 | 57.8 |
| 4 | 13.451 | 1.11 | | | |
| 5 | 13.557 | 2.5 | 3 | 1.585 | 29.3 |
| 6 | 671.382 | variable | | | |
| 7 | diaphragm | 1.5 | | | |
| 8 | 31.829 | 2.7 | 4 | 1.5168 | 64.2 |
| 9 | −25.755 | 0.2 | | | |
| 10 | 8.692 | 5.1 | 5 | 1.49154 | 57.8 |
| 11 | −38.601 | 0.5 | | | |
| 12 | −19.994 | 2.46 | 6 | 1.585 | 29.3 |
| 13 | 7.04 | 1.25 | | | |
| 14 | 15.485 | 2.8 | 7 | 1.5168 | 64.2 |
| 15 | −18.251 | variable | | | |
| 16 | ∞ | 5.0 | 8 | 1.5168 | 64.2 |
| 17 | ∞ | | | | |

| | Aspherical surface | | |
|---|---|---|---|
| face number i | conical constant K | coefficient B | C |
| 3 | −25.8014 | $1.8241 \cdot 10^{-6}$ | $5.449 \cdot 10^{-7}$ |
| 6 | −1331.74 | $7.877 \cdot 10^{-7}$ | $5.1245 \cdot 10^{-8}$ |
| 10 | −0.022586 | $-6.9179 \cdot 10^{-6}$ | $2.0174 \cdot 10^{-7}$ |
| 13 | 0.060281 | $3.8547 \cdot 10^{-5}$ | $-1.799 \cdot 10^{-6}$ |

Figure 3A:
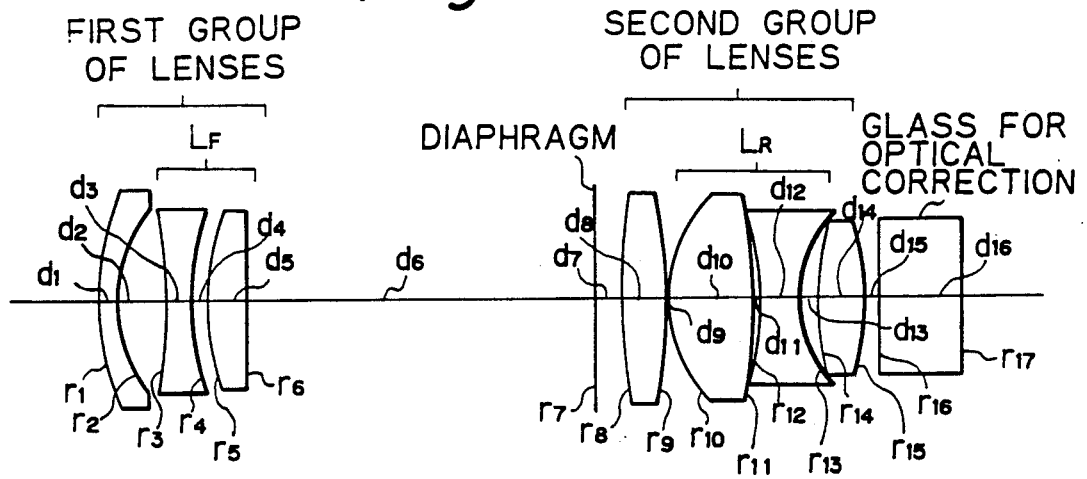
Figure 3B:
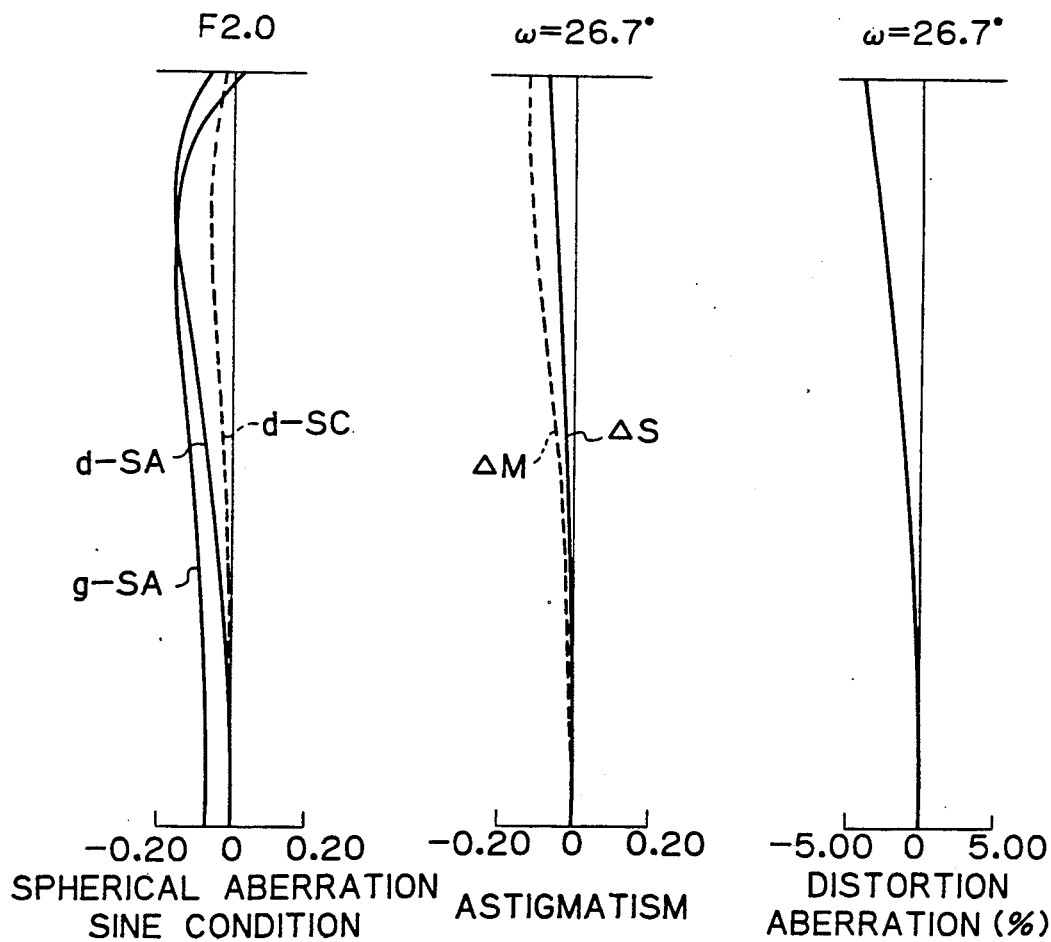
Figure 3C:
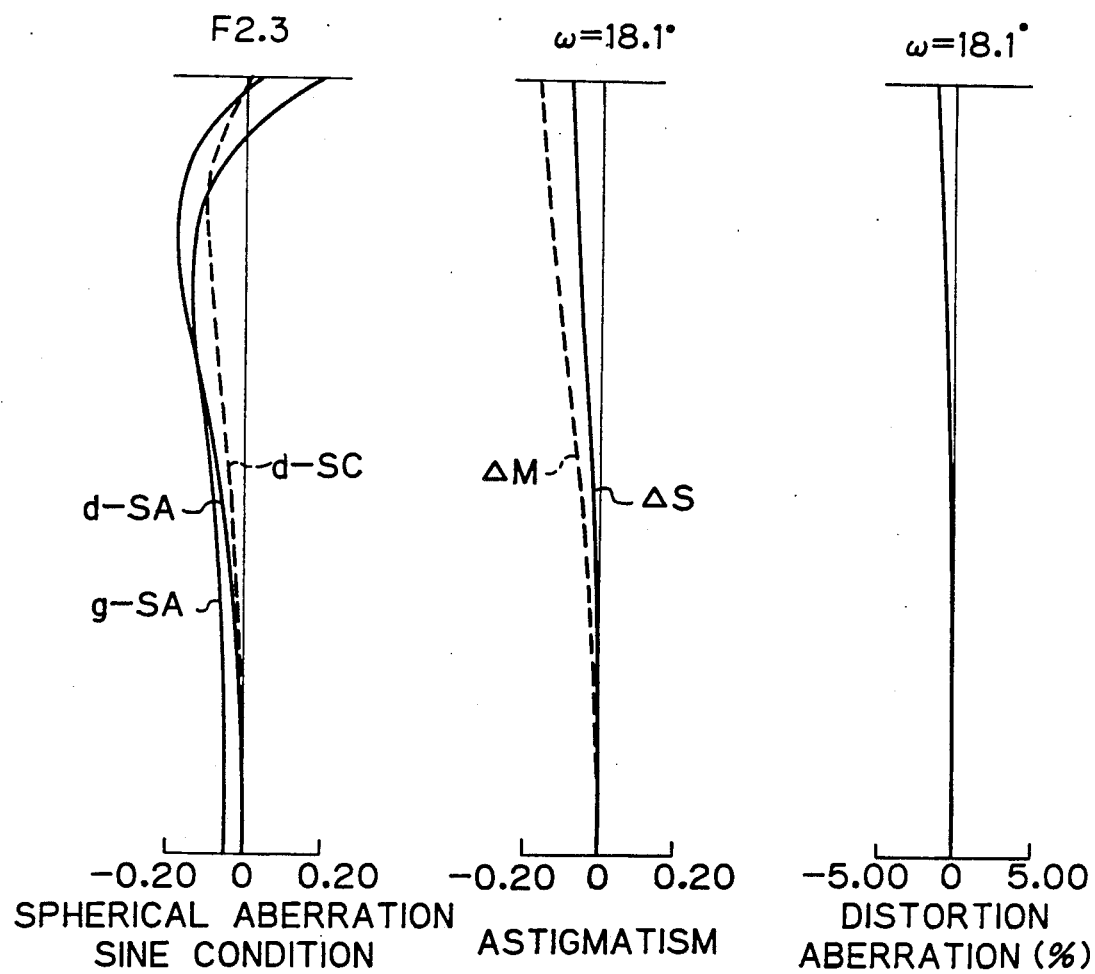
Figure 3D:
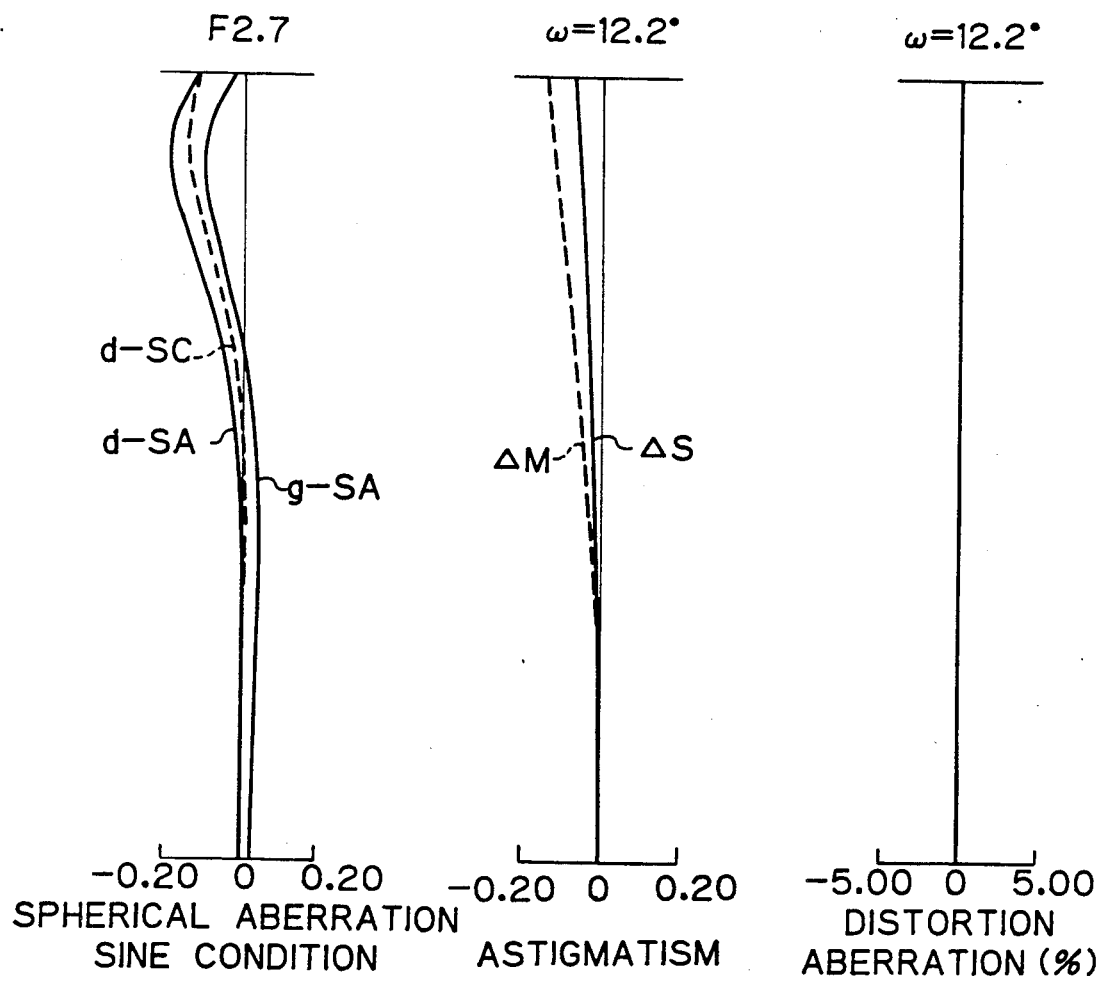

| variable amounts | | | |
|---|---|---|---|
| F | 8.5 | 12.7 | 19.0 |
| $d_6$ | 21.038 | 9.565 | 1.891 |
| $d_{15}$ | 7.716 | 11.149 | 16.282 |
| $\Delta bf$ | 0.019 | 0.016 | 0.006 |
| $\Delta bf_F$ | −0.001 | −0.001 | −0.003 |
| $\Delta bf_R$ | 0.02 | 0.018 | 0.009 | parameters in conditional formulas $|f_I|/F_W = 2.24$, $f_{II}/|f_I| = 0.82$, $f_{II}/f_R = -0.22$ $|f_I/f_F| = 0.1$,
$(r_{RP1}^* - r_{RP2}^*)/(r_{RP1}^* + r_{RP2}^*) = -1.58$ $d_{RA}/(d_{RP} + d_{RA} + d_{RN}) = 0.062$, $(r_{FP1}^* - r_{FP2}^*)/(r_{FP1}^* + r_{FP2}^*) = -0.96$, $\Delta_{FN1}/r_{FN1}{}^* = -7.4 \cdot 10^{-4}$ FIG. 3a shows the construction of a zoom lens in the concrete embodiment 2. FIGS. 3b, 3c and 3d are respectively aberration diagrams of the zoom lens in the concrete embodiment 2 at a wide angular terminal, an intermediate portion and a telescopic terminal thereof.

Embodiment 3

| | F = 8.5~19, $F_{NO}$ = 2~2.7, 2ω = 54~24° | | | | |
|---|---|---|---|---|---|
| i | $r_i$ | $d_i$ | j | $n_j$ | $v_j$ |
| 1 | 15.804 | 1.2 | 1 | 1.834 | 37.3 |
| 2 | 7.516 | 2.36 | | | |
| 3 | −28.101 | 1.7 | 2 | 1.49154 | 57.8 |
| 4 | 14.729 | 0.88 | | | |
| 5 | 14.479 | 2.5 | 3 | 1.585 | 29.3 |
| 6 | −117.124 | variable | | | |
| 7 | diaphragm | 1.5 | | | |
| 8 | 46.328 | 2.1 | 4 | 1.62041 | 60.3 |
| 9 | −30.848 | 0.2 | | | |
| 10 | 8.912 | 5.1 | 5 | 1.49154 | 57.8 |
| 11 | −25.950 | 0.45 | | | |
| 12 | −17.645 | 3.14 | 6 | 1.585 | 29.3 |
| 13 | 6.927 | 1.67 | | | |
| 14 | 13.147 | 2.7 | 7 | 1.51823 | 59.0 |
| 15 | −18.399 | variable | | | |
| 16 | ∞ | 5.0 | 8 | 1.5168 | 64.2 |
| 17 | ∞ | | | | |

| Aspherical surface | | | |
|---|---|---|---|
| face number i | conical constant K | coefficient B | C |
| 3 | −8.2036 | $7.1475 \cdot 10^{-6}$ | $3.0085 \cdot 10^{-9}$ |
| 6 | 290.833 | $1.507 \cdot 10^{-6}$ | $-2.888 \cdot 10^{-7}$ |
| 11 | 0.19656 | $6.9726 \cdot 10^{-6}$ | $-1.0028 \cdot 10^{-7}$ |
| 12 | 0.25215 | $-8.6296 \cdot 10^{-7}$ | $1.1354 \cdot 10^{-7}$ |

Figure 4A:
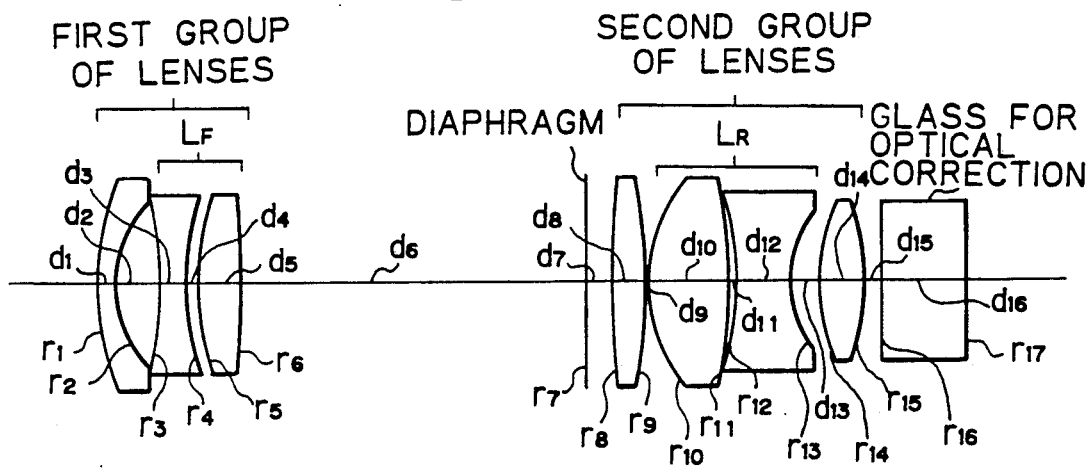
Figure 4B:
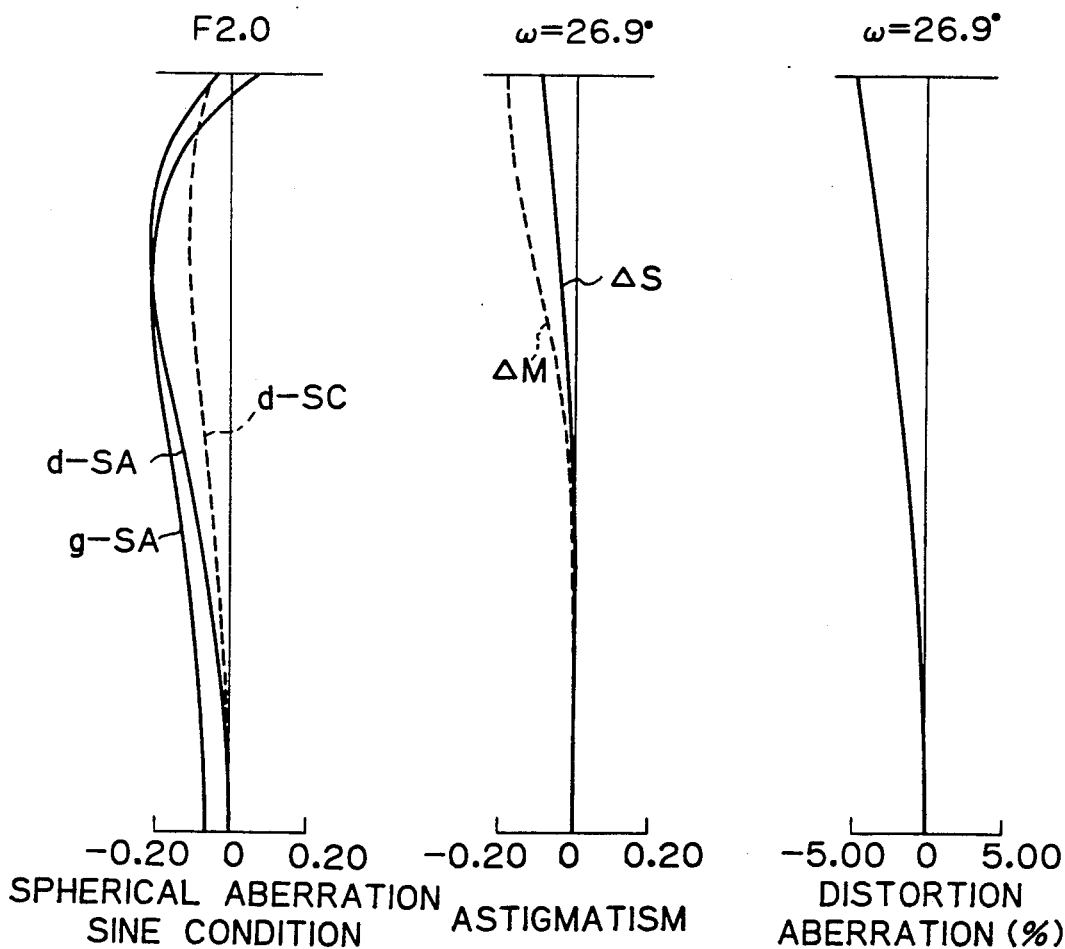
Figure 4D:
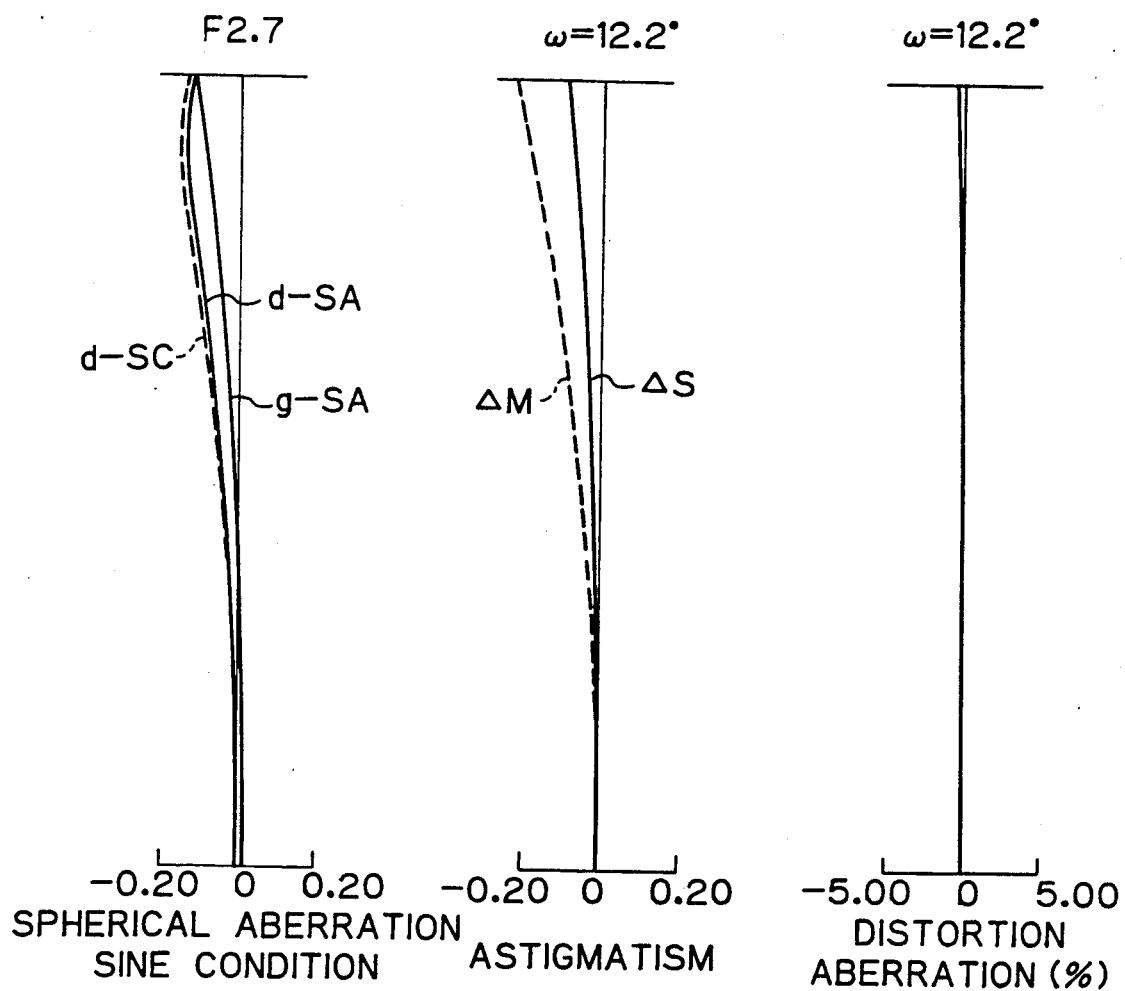

| variable amounts | | | |
|---|---|---|---|
| F | 8.5 | 12.7 | 19.0 |
| $d_6$ | 20.565 | 9.31 | 1.783 |
| $d_{15}$ | 7.919 | 11.51 | 16.878 |
| Δbf | 0.02 | 0.016 | 0.005 |
| $\Delta bf_F$ | 0.0 | 0.001 | 0.002 |
| $\Delta bf_R$ | 0.019 | 0.015 | 0.003 | parameters in conditional formulas $|f_I|/F_W = 2.16$, $f_{II}/|f_I| = 0.85$, $f_{II}/f_R = -0.22$ $|f_I/f_F| = 0.06$,
$(r_{RP1}{}^* - r_{RP2}{}^*)/(r_{RP1}{}^* + r_{RP2}{}^*) = -2.0$ $d_{RA}/(d_{RP}+d_{RA}+d_{RN}) = 0.05$, $(r_{FP1}{}^* - r_{FP2}{}^*)/(r_{FP1}{}^* + r_{FP2}{}^*) = -1.28$, $\Delta_{FN1}/r_{FN1}{}^* = -6.6 \cdot 10^{-4}$ FIG. 4a shows the construction of a zoom lens in the concrete embodiment 3. FIGS. 4b, 4c and 4d are respectively aberration diagrams of the zoom lens in the concrete embodiment 3 at a wide angular terminal, an intermediate portion and a telescopic terminal thereof.

Embodiment 4

| | F = 9~18, $F_{NO}$ = 2~2.6, 2ω = 51~26° | | | | |
|---|---|---|---|---|---|
| i | $r_i$ | $d_i$ | j | $n_j$ | $v_j$ |
| 1 | 16.341 | 1.1 | 1 | 1.8061 | 40.7 |
| 2 | 8.002 | 3.47 | | | |
| 3 | 720.186 | 1.5 | 2 | 1.4997 | 56.1 |
| 4 | 12.685 | 1.09 | | | |
| 5 | 12.882 | 2.5 | 3 | 1.585 | 29.3 |
| 6 | 46.704 | variable | | | |
| 7 | ∞ | 1.2 | 4 | 1.49154 | 57.8 |
| 8 | ∞ | 1.5 | | | |
| 9 | diaphragm | 1.5 | | | |
| 10 | 56.099 | 2.7 | 5 | 1.5168 | 64.2 |
| 11 | −23.232 | 0.2 | | | |
| 12 | 9.013 | 5.3 | 6 | 1.49154 | 57.8 |
| 13 | −32.337 | 0.55 | | | |
| 14 | −20.562 | 3.12 | 7 | 1.585 | 29.3 |
| 15 | 7.546 | 1.26 | | | |
| 16 | 16.028 | 2.8 | 8 | 1.5168 | 64.2 |
| 17 | −19.28 | | | | |

| Aspherical surface | | | |
|---|---|---|---|
| face number i | conical constant K | coefficient B | C |
| 4 | −0.54052 | $-4.1292 \cdot 10^{-5}$ | $-2.6739 \cdot 10^{-7}$ |
| 6 | −1.48198 | $-1.307 \cdot 10^{-5}$ | $9.1566 \cdot 10^{-8}$ |
| 12 | −0.048243 | $-6.2615 \cdot 10^{-6}$ | |
| 14 | 2.3435 | $-1.4813 \cdot 10^{-5}$ | $8.3069 \cdot 10^{-7}$ |

Figure 5A:
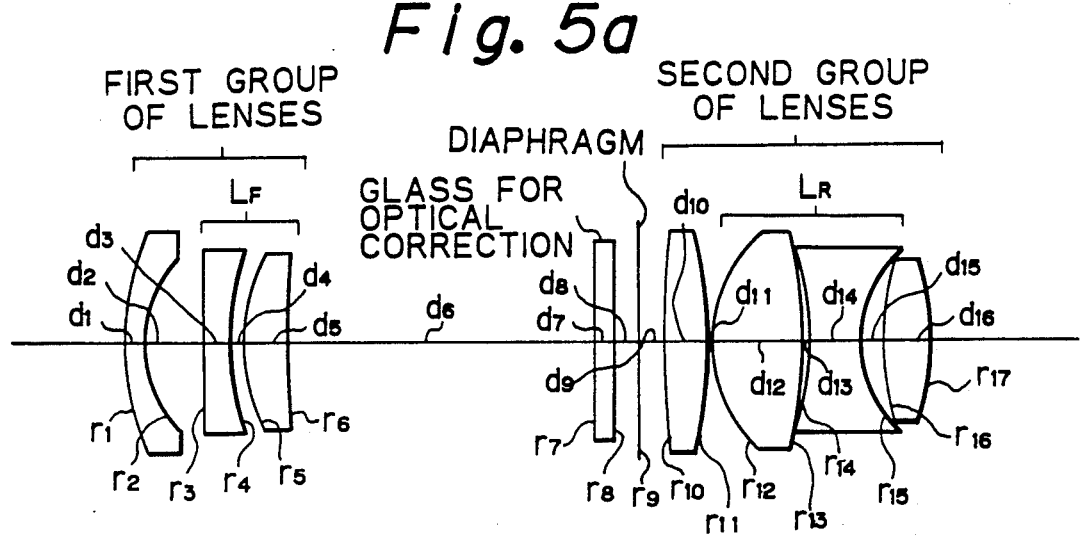
Figure 5B:
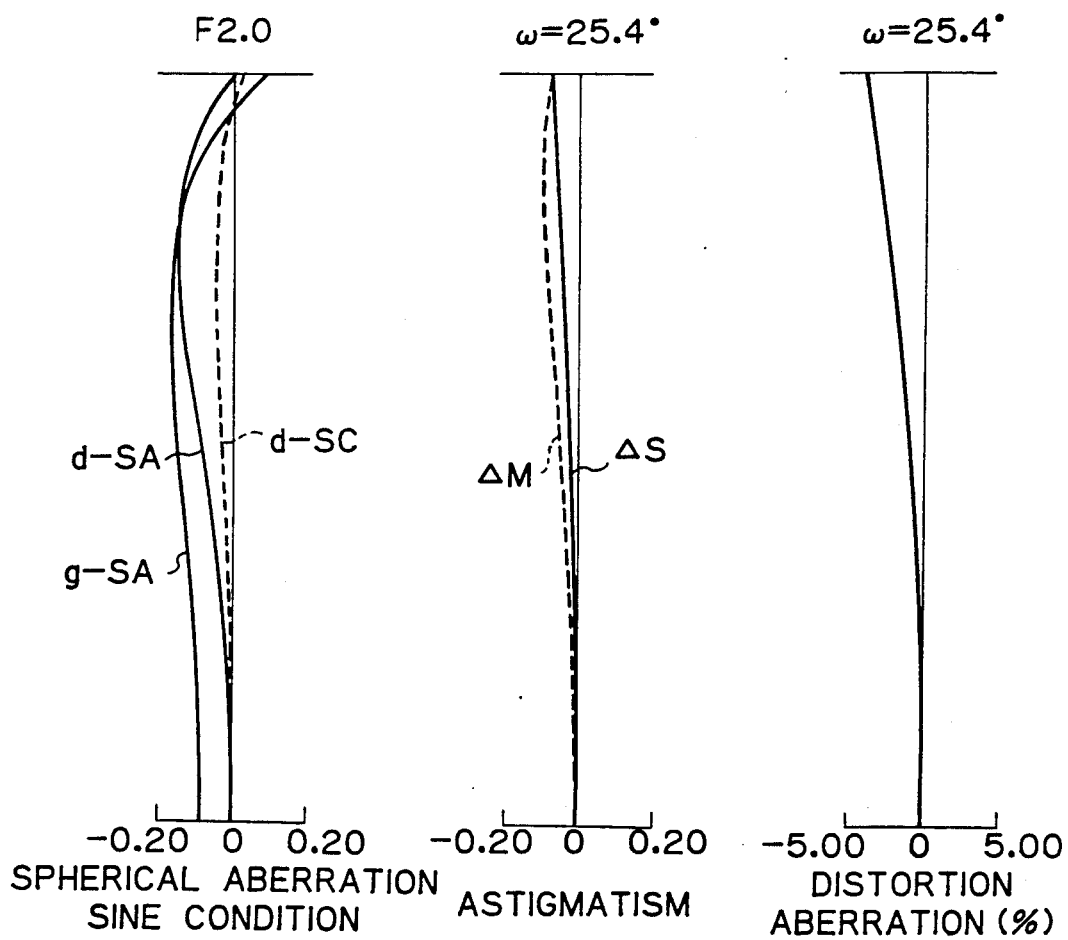
Figure 5C:
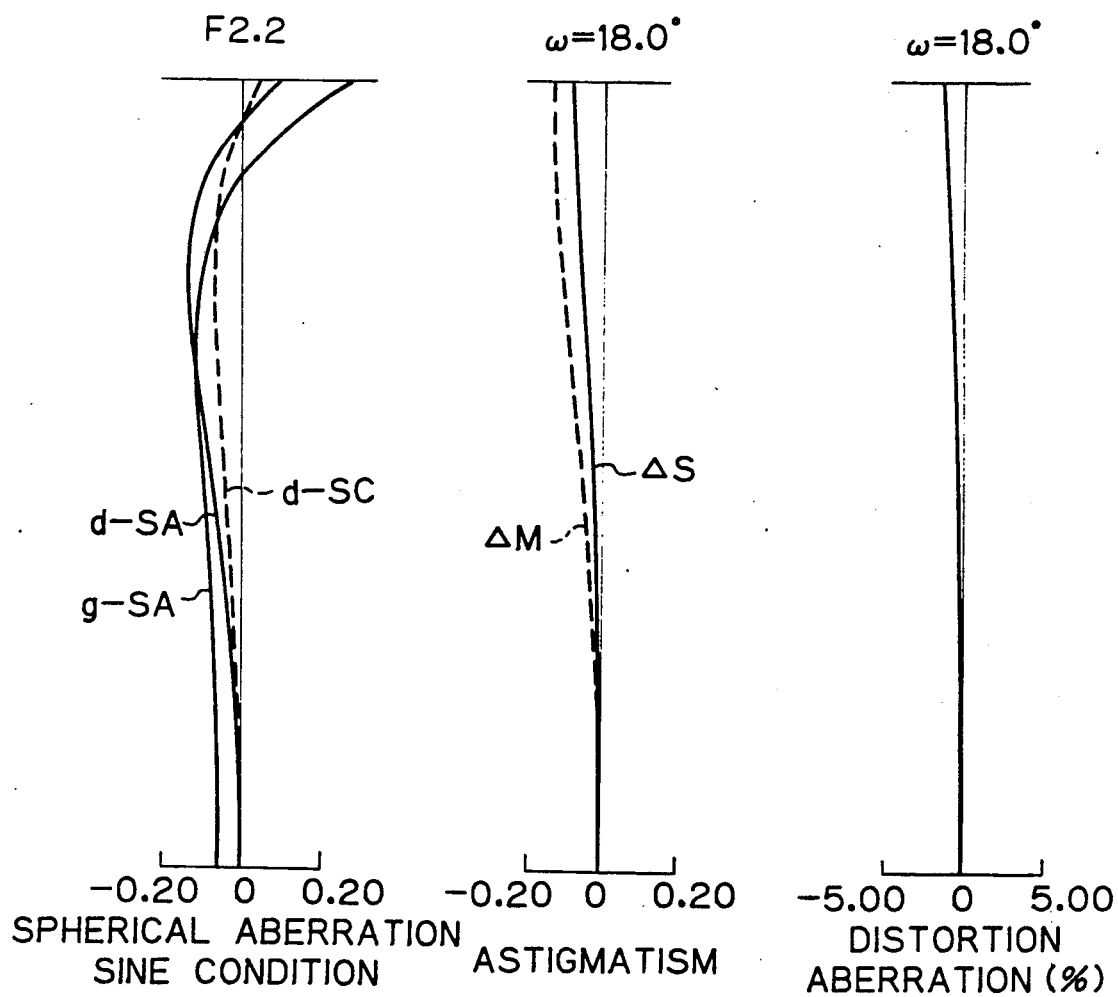
Figure 5D:
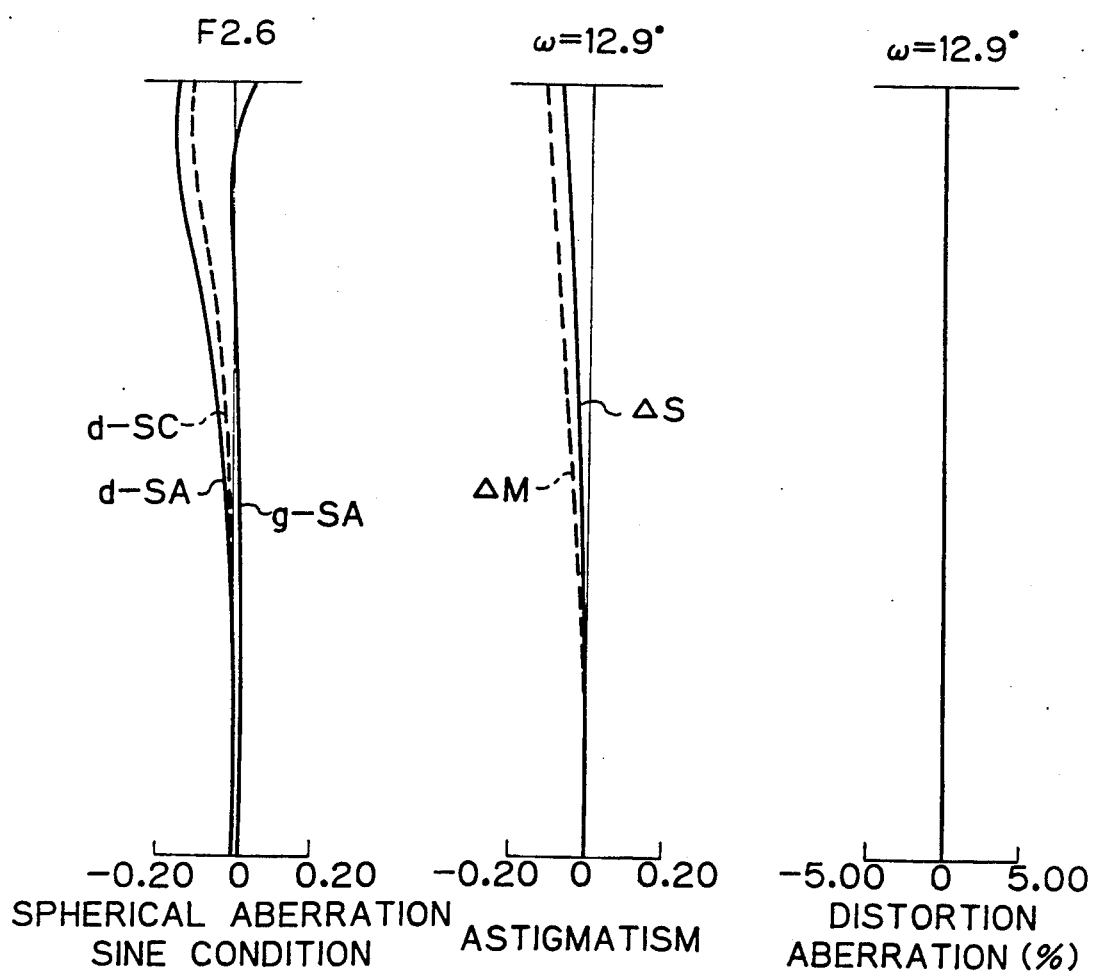

| variable amounts | | | |
|---|---|---|---|
| F | 9.0 | 12.7 | 18.0 |
| $d_6$ | 18.752 | 8.859 | 1.863 |
| Δbf | 0.03 | 0.029 | 0.023 |
| $\Delta bf_F$ | −0.002 | −0.005 | −0.009 |
| $\Delta bf_R$ | 0.032 | 0.033 | 0.030 | parameters in conditional formulas $|f_I|/F_W = 2.11$, $f_{II}/|f_I| = 0.84$, $f_{II}/f_R = -0.13$ $|f_I/f_F| = 0.08$,
$(r_{RP1}{}^* - r_{RP2}{}^*)/(r_{RP1}{}^* + r_{RP2}{}^*) = -1.8$ $d_{RA}/(d_{RP}+d_{RA}+d_{RN}) = 0.061$, $(r_{FP1}{}^* - r_{FP2}{}^*)/(r_{FP1}{}^* + r_{FP2}{}^*) = -0.57$, $\Delta_{FN2}/r_{FN2}{}^* = -2.1 \cdot 10^{-3}$ FIG. 5a shows the construction of a zoom lens in the concrete embodiment 4. FIGS. 5b, 5c and 5d are respectively aberration diagrams of the zoom lens in the concrete embodiment 4 at a wide angular terminal, an intermediate portion and a telescopic terminal thereof.

Embodiment 5

| | F = 9~18, $F_{NO}$ = 2~2.6, 2ω = 51~26° | | | | |
|---|---|---|---|---|---|
| i | $r_i$ | $d_i$ | j | $n_j$ | $v_j$ |
| 1 | 12.055 | 1.0 | 1 | 1.834 | 37.3 |
| 2 | 7.364 | 2.81 | | | |
| 3 | −35.98 | 1.6 | 2 | 1.49154 | 57.8 |
| 4 | 12.753 | 1.15 | | | |
| 5 | 13.339 | 2.5 | 3 | 1.585 | 29.3 |
| 6 | 118.155 | variable | | | |
| 7 | ∞ | 1.2 | 4 | 1.49154 | 57.8 |
| 8 | ∞ | 1.5 | | | |
| 9 | diaphragm | 1.5 | | | |
| 10 | 39.215 | 2.8 | 5 | 1.5168 | 64.2 |
| 11 | −32.265 | 0.2 | | | |
| 12 | 8.683 | 5.0 | 6 | 1.49154 | 57.8 |
| 13 | −23.368 | 0.54 | | | |
| 14 | −18.814 | 2.59 | 7 | 1.585 | 29.3 |
| 15 | 7.269 | 1.25 | | | |
| 16 | 15.053 | 3.0 | 8 | 1.51742 | 52.2 |
| 17 | −20.195 | | | | |

| Aspherical surface | | | |
|---|---|---|---|
| face number i | conical constant K | coefficient B | C |
| 3 | −57.759 | $-5.9984 \cdot 10^{-5}$ | $9.4566 \cdot 10^{-7}$ |
| 5 | 0.49682 | $-7.1886 \cdot 10^{-6}$ | $3.0882 \cdot 10^{-7}$ |
| 12 | −0.058431 | | |
| 14 | 3.64553 | $-2.8212 \cdot 10^{-5}$ | $1.851 \cdot 10^{-6}$ |

| variable amounts | | | |
|---|---|---|---|
| F | 9.0 | 12.7 | 18.0 |
| $d_6$ | 19.658 | 9.244 | 1.88 |
| Δbf | 0.029 | 0.026 | 0.016 |

-continued

Figure 6A:
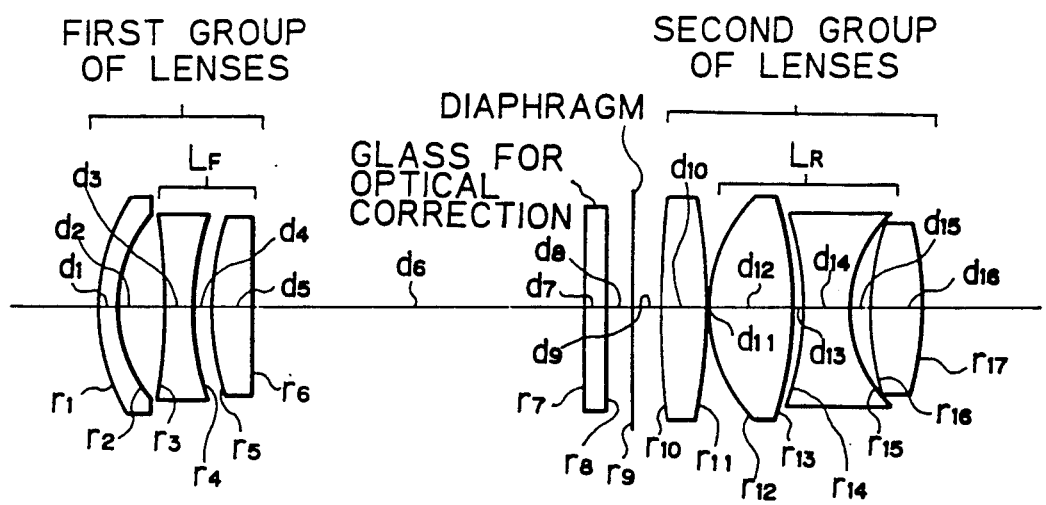
Figure 6B:
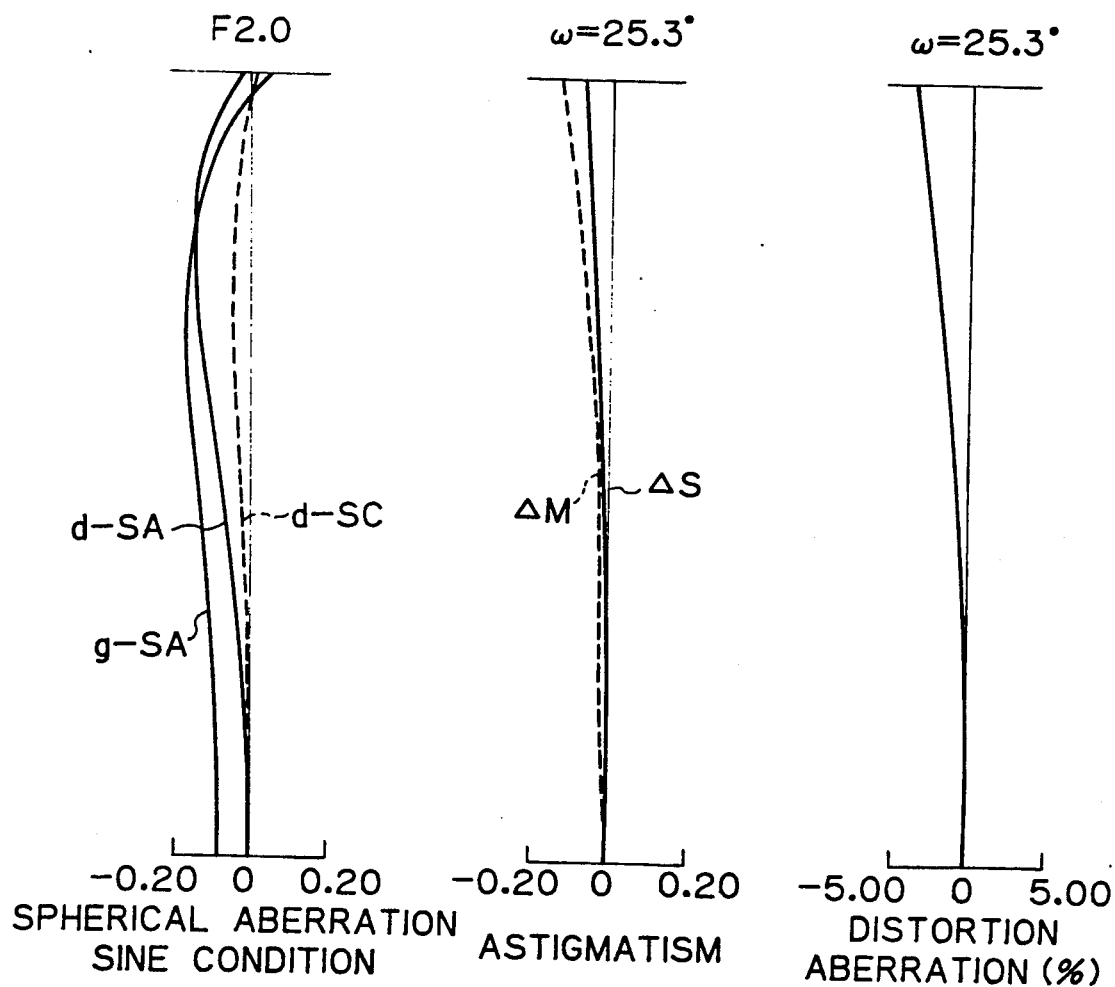
Figure 6C:
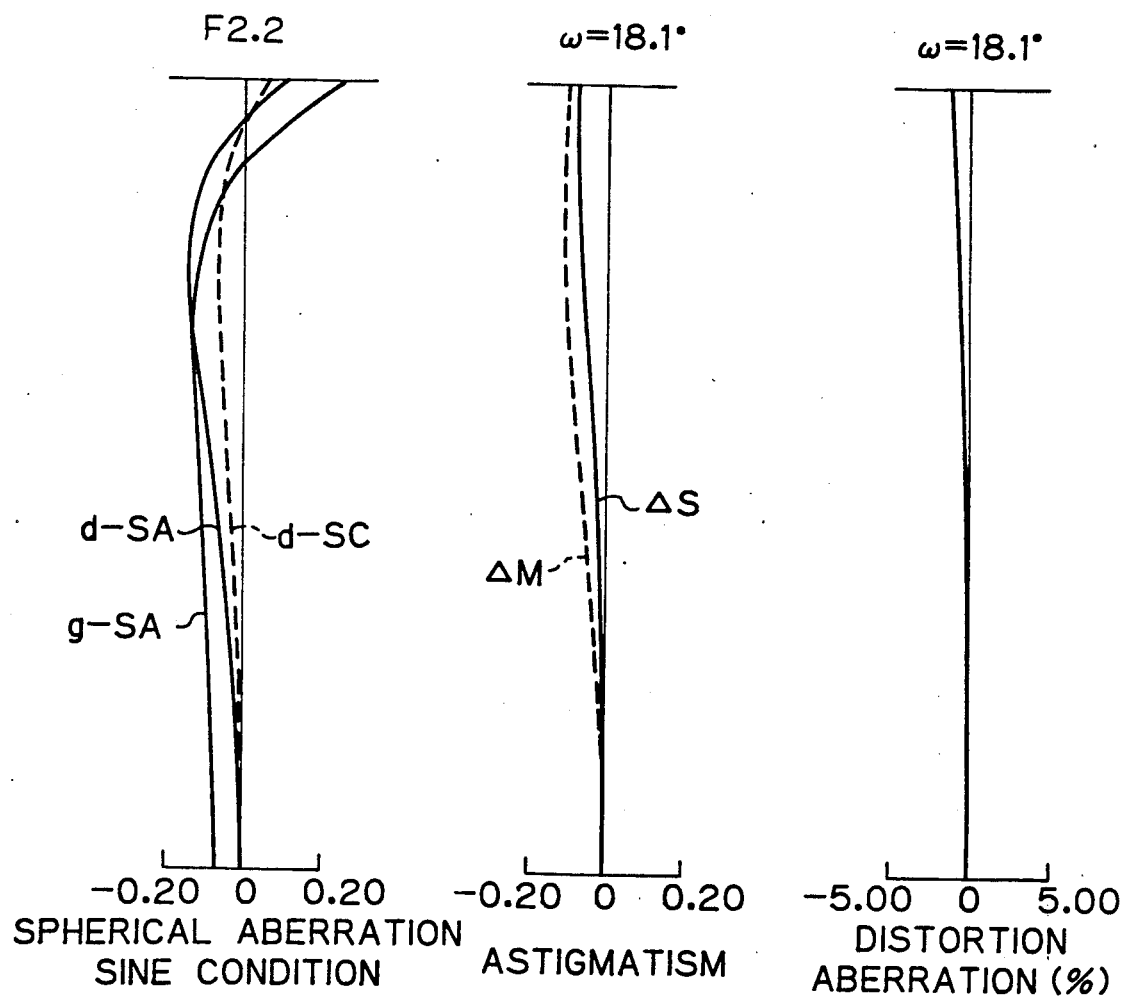
Figure 6D:
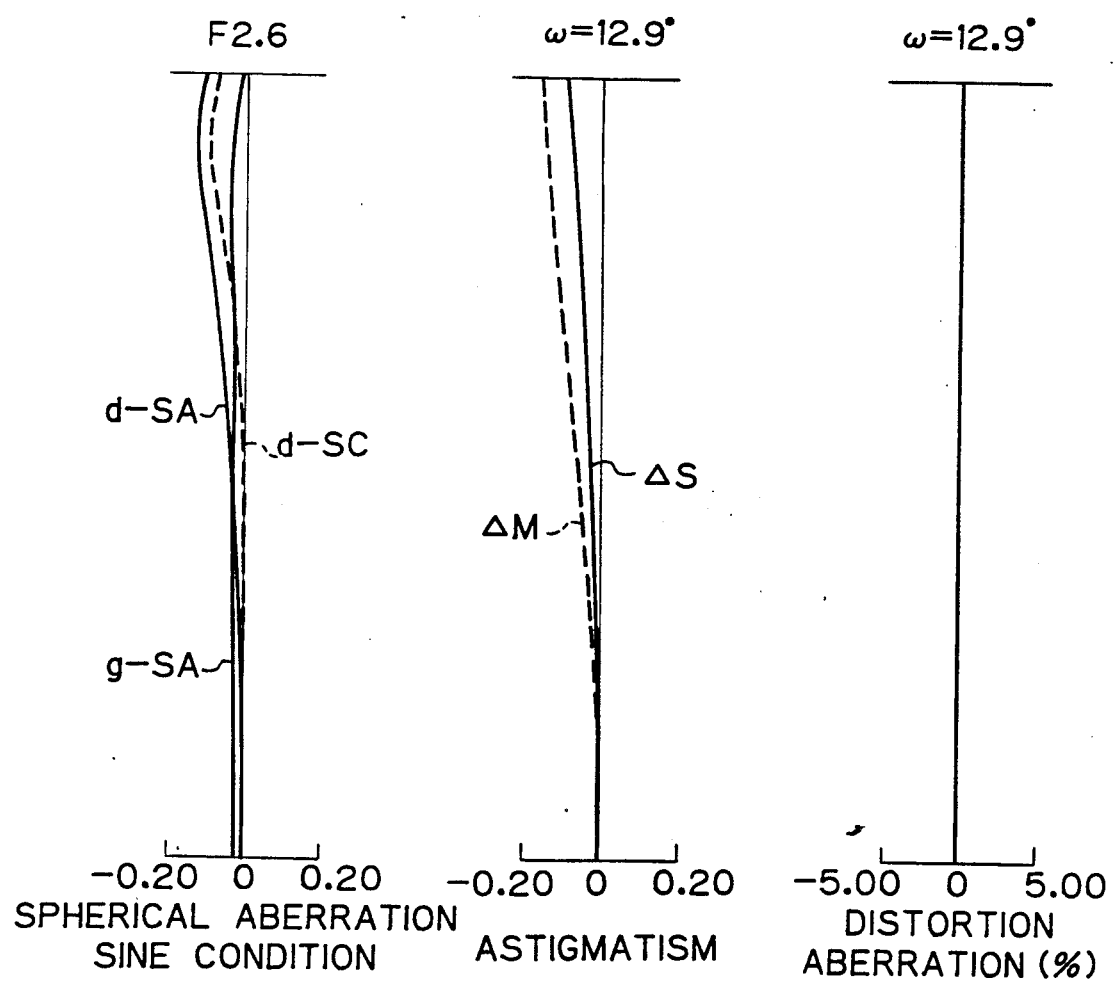

|  |  |  |  |
|---|---|---|---|
| $\Delta bf_F$ | −0.006 | −0.01 | −0.021 |
| $\Delta bf_R$ | 0.034 | 0.036 | 0.035 | parameters in conditional formulas $|f_I|/F_W = 2.22$, $f_{II}/|f_I| = 0.8$, $f_{II}/f_R = -0.09$ $|f_I/f_F| = 0.22$,
$(r_{RP1}{}^* - r_{RP2}{}^*)/(r_{RP1}{}^* + r_{RP2}{}^*) = -2.2$ $d_{RA}/(d_{RP} + d_{RA} + d_{RN}) = 0.066$, $(r_{FP1}{}^* - r_{FP2}{}^*)/(r_{FP1}{}^* + r_{FP2}{}^*) = -0.8$, $\Delta_{FN1}/r_{FN1}{}^* = -7.2 \cdot 10^{-4}$ FIG. 6a shows the construction of a zoom lens in the concrete embodiment 5. FIGS. 6b, 6c and 6d are respectively aberration diagrams of the zoom lens in the concrete embodiment 5 at a wide angular terminal, an intermediate portion and a telescopic terminal thereof.

Embodiment 6

| $F = 9 \sim 18$, $F_{NO} = 2 \sim 2.6$, $2\omega = 51 \sim 26°$ | | | | |
|---|---|---|---|---|
| i | $r_i$ | $d_i$ | j | $n_j$ | $\nu_j$ |
| 1 | 13.531 | 1.0 | 1 | 1.834 | 37.3 |
| 2 | 7.906 | 3.49 | | | |
| 3 | −61.112 | 1.6 | 2 | 1.49154 | 57.8 |
| 4 | 12.298 | 1.07 | | | |
| 5 | 13.018 | 2.5 | 3 | 1.585 | 29.3 |
| 6 | 69.377 | variable | | | |
| 7 | ∞ | 1.2 | 4 | 1.49154 | 57.8 |
| 8 | ∞ | 1.5 | | | |
| 9 | diaphragm | 1.5 | | | |
| 10 | 57.738 | 2.8 | 5 | 1.5168 | 64.2 |
| 11 | −21.996 | 0.2 | | | |
| 12 | 8.91 | 5.0 | 6 | 1.49154 | 57.8 |
| 13 | −33.652 | 0.54 | | | |
| 14 | −20.629 | 3.41 | 7 | 1.585 | 29.3 |
| 15 | 7.377 | 1.26 | | | |
| 16 | 15.906 | 3.0 | 8 | 1.5168 | 64.2 |
| 17 | −19.62 | | | | |

| Aspherical surface | | | |
|---|---|---|---|
| face number i | conical constant K | coefficient B | C |
| 3 | −150.258 | $-1.3602 \cdot 10^{-5}$ | $3.0888 \cdot 10^{-7}$ |
| 5 | 0.41074 | $-3.0093 \cdot 10^{-6}$ | $1.5012 \cdot 10^{-7}$ |
| 12 | −0.044004 | | |
| 14 | 2.26345 | $-1.4319 \cdot 10^{-5}$ | $8.9951 \cdot 10^{-7}$ |

Figure 7A:
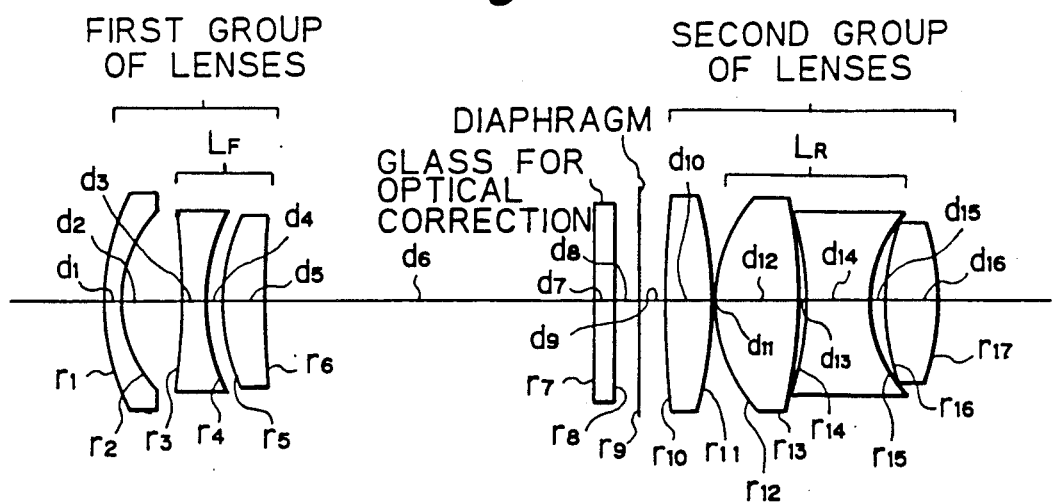
Figure 7B:
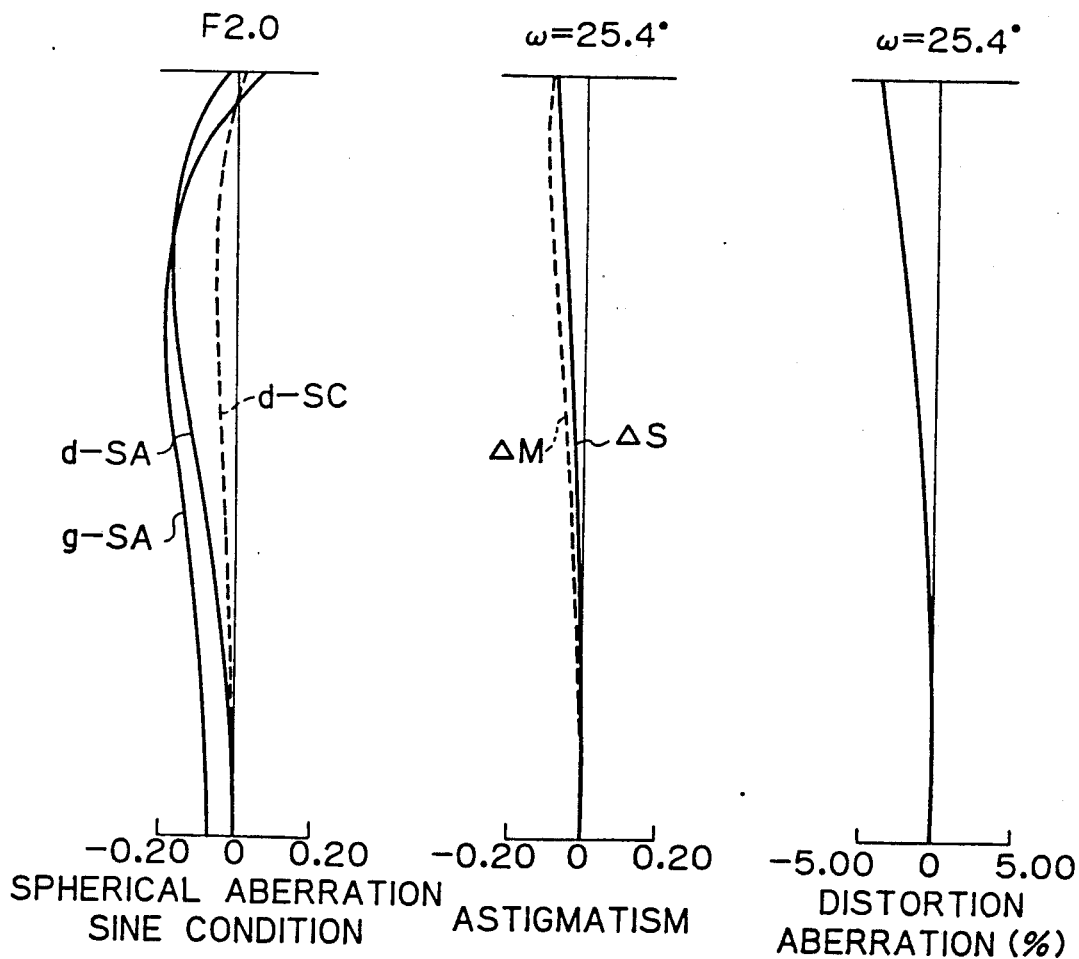
Figure 7C:
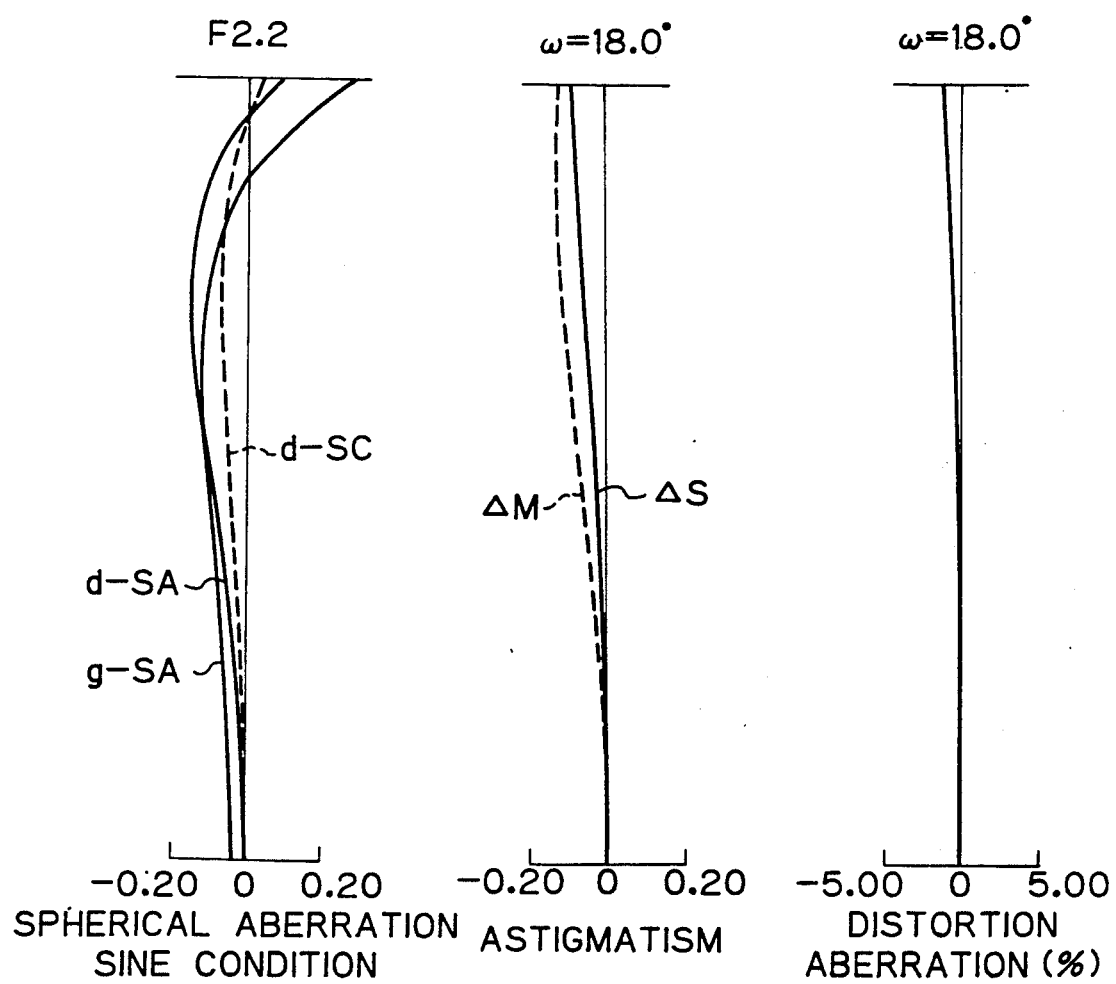
Figure 7D:
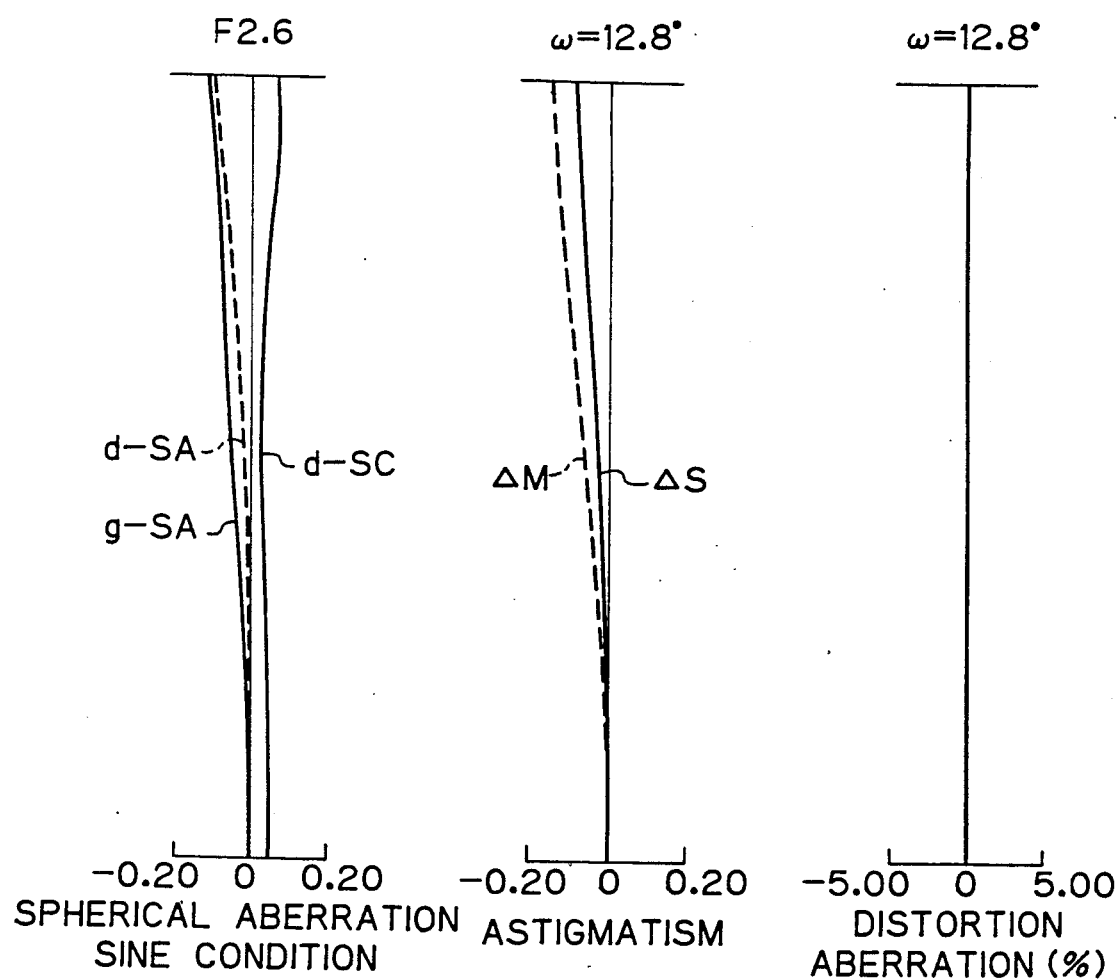

| variable amounts | | | |
|---|---|---|---|
| F | 9.0 | 12.7 | 18.0 |
| $d_6$ | 19.649 | 9.235 | 1.871 |
| $\Delta bf$ | 0.025 | 0.021 | 0.009 |
| $\Delta bf_F$ | −0.005 | −0.01 | −0.021 |
| $\Delta bf_R$ | 0.03 | 0.031 | 0.029 | parameters in conditional formulas $|f_I|/F_W = 2.22$, $f_{II}/|f_I| = 0.8$, $f_{II}/f_R = -0.15$ $|f_I/f_F| = 0.19$,
$(r_{RP1}{}^* - r_{RP2}{}^*)/(r_{RP1}{}^* + r_{RP2}{}^*) = -1.7$ $d_{RA}/(d_{RP} + d_{RA} + d_{RN}) = 0.06$, $(r_{FP1}{}^* - r_{FP2}{}^*)/(r_{FP1}{}^* + r_{FP2}{}^*) = -0.68$, $\Delta_{FN1}/r_{FN1}{}^* = -3.4 \cdot 10^{-4}$ FIG. 7a shows the construction of a zoom lens in the concrete embodiment 6. FIGS. 7b, 7c and 7d are respectively aberration diagrams of the zoom lens in the concrete embodiment 6 at a wide angular terminal, an intermediate portion and a telescopic terminal thereof.

As mentioned above, in accordance with a novel plastic zoom lens in the present invention, many plastic lenses are used so that it is possible to effectively utilize the advantages of lightness in weight and reduced cost in manufacturing the plastic lens.

Further, since a plurality of plastic lenses are used a pair, it is possible to effectively prevent image forming performance from being reduced by deformation of the plastic lens and the change in refractive index thereof caused by the change in temperature. When the plastic lenses are used in the first and second groups of lenses, moving amounts of the image forming faces caused by the change in temperature become small and are canceled so that it is possible to provide a plastic zoom lens preferable with respect to the change in temperature.

In the above concrete embodiments, the moving amounts of the positions of the image forming faces caused by the change in temperature are less than ±0.08 mm. Accordingly, it is possible to practically use this plastic zoom lens as a zoom lens for a video camera having F-number 2 without any problems.

Many widely different embodiments of the present invention may be constructed without departing from the spirit and scope of the present invention. It should be understood that the present invention is not limited to the specific embodiments described in the specification, except as defined in the appended claims.

What is claimed is:

1. A plastic zoom lens comprising:
   a first group of lenses having negative refracting power and arranged on an object side of the zoom lens;
   a second group of lenses having positive refracting power and arranged on an image side of the zoom lens; and
   means for changing a focal length of the plastic zoom lens by changing a distance between the first and second group of lenses;
   said second group of lenses having a second lens group which comprises a positive plastic lens having a large curvature face on the object side thereof and a negative plastic lens having a large curvature face on the image side thereof, said positive and negative plastic lenses being sequentially arranged from the object side of the zoom lens, said second group of lenses further having at least one positive lens arranged on each of the object and image sides of the second lens group;
   a focal length $f_I$ of said first group of lenses, a focal length $f_{II}$ of said second group of lenses, a combined focal length $F_W$ of an entire lens system at a wide angular terminal thereof, and Abbe numbers $\nu_{RP}$ and $\nu_{RN}$ of the positive and negative lenses in said second lens group satisfying the following conditions, $1.7 < |f_I|/F_W < 2.5$      (a)

$0.7 < f_{II}/|f_I| < 1.0$      (b)

$\nu_{RP} > 50$      (c)

$\nu_{RN} < 37$      (d).

2. A plastic zoom lens as claimed in claim 1, wherein said first group of lenses have a first lens group which comprises a negative plastic lens having a large curvature face on the image side thereof and at least one aspherical surface and a positive plastic lens having a large curvature face on the object side thereof, and said negative and positive plastic lenses are sequentially arranged from the object side of the zoom lens, and said first group of lenses further have at least one negative lens arranged on the object side of the first lens group.

3. A plastic zoom lens as claimed in claim 1, wherein changes in position of a face for forming an image thereon caused by a change in temperature with respect to the positive and negative lenses are canceled with respect to each other.

4. A plastic zoom lens comprising:
- a first group of lenses having negative refracting power and arranged on an object side of the zoom lens;
- a second group of lenses having positive refracting power and arranged on an image side of the zoom lens; and
- means for changing a focal length of the plastic zoom lens by changing a distance between the first and second groups of lenses;
- said first group of lenses having a first lens group which comprises a negative plastic lens having a large curvature face on the image side thereof and at least one aspherical surface and a positive plastic lens having a large curvature face on the object side thereof, said negative and positive plastic lenses being sequentially arranged from the object side of the zoom lens, said first group of lenses further having at least one negative lens arranged on the object side of the first lens group;
- a focal length $f_I$ of said first group of lenses, a focal length $f_{II}$ of said second group of lenses, a combined focal length $F_W$ of an entire lens system at a wide angular terminal thereof, and Abbe numbers $\nu_{FN}$ and $\nu_{FP}$ of the negative and positive lenses in said first lens group satisfying the following conditions, $1.7 < |f_I|/F_W < 2.5$      (a)

$0.7 < f_{II}/|f_I| < 1.0$      (b)

$\nu_{FN} > 50$      (e)

$\nu_{FP} < 37$      (f).

5. A plastic zoom lens as claimed in claim 4, wherein said second group of lenses have a second lens group which comprises a positive plastic lens having a large curvature face on the object side thereof and a negative plastic lens having a large curvature face on the image side thereof, and said positive and negative plastic lenses are sequentially arranged from the object side of the zoom lens, and said second group of lenses further have at least one positive lens arranged on each of the object and image sides of the second lens group.

6. A plastic zoom lens as claimed in claim 4, wherein changes in position of a face for forming an image thereon caused by a change in temperature with respect to the positive and negative lenses are canceled with respect to each other.

7. A plastic zoom lens comprising:
- a first group of lenses having negative refracting power and arranged on an object side of the zoom lens;
- a second group of lenses having positive refracting power and arranged on an image side of the zoom lens; and
- means for changing a focal length of the plastic zoom lens by changing a distance between the first and second groups of lenses;
- said first group of lenses having a first lens group which comprises a negative plastic lens having a large curvature face on the image side thereof and at least one aspherical surface and a positive plastic lens having a large curvature face on the object side thereof, said negative and positive plastic lenses being sequentially arranged from the object side of the zoom lens, said first group of lenses further having at least one negative lens arranged on the object side of the first lens group;
- said second group of lenses having a second lens group which comprises a positive plastic lens having a large curvature face on the object side thereof and a negative plastic lens having a large curvature face on the image side thereof, said positive and negative plastic lenses being sequentially arranged from the object side of the zoom lens, said second group of lenses further having at least one positive lens arranged on each of the object and image sides of the second lens group;
- a focal length $f_I$ of said first group of lenses, a focal length $f_{II}$ of said second group of lenses, a combined focal length $F_W$ of an entire lens system at a wide angular terminal thereof, Abbe numbers $\nu_{FN}$ and $\nu_{FP}$ of the negative and positive lenses in said first lens group, and Abbe numbers $\nu_{RP}$ and $\nu_{RN}$ of the positive and negative lenses in said second lens group satisfying the following conditions, $1.7 < |f_I|/F_W < 2.5$      (a)

$0.7 < f_{II}/|f_I| < 1.0$      (b)

$\nu_{RP} > 50$      (c)

$\nu_{RN} < 37$      (d)

$\nu_{FN} > 50$      (e)

$\nu_{FP} < 37$      (f).

8. A plastic zoom lens as claimed in claim 7, wherein changes in position of a face for forming an image thereon caused by a change in temperature with respect to the positive and negative lenses are canceled with respect to each other.

* * * * *